(12) United States Patent
Fukuyoshi et al.

(10) Patent No.: US 9,752,479 B2
(45) Date of Patent: Sep. 5, 2017

(54) ENGINE APPARATUS

(71) Applicant: YANMAR CO., LTD., Osaka (JP)

(72) Inventors: Shinya Fukuyoshi, Osaka (JP); Kazuyuki Miyazaki, Osaka (JP)

(73) Assignee: Yanmar Co., Ltd., Osaka (JP)

(*) Notice: Subject to any disclaimer, the term of this patent is extended or adjusted under 35 U.S.C. 154(b) by 0 days.

(21) Appl. No.: 14/412,012

(22) PCT Filed: Jul. 5, 2013

(86) PCT No.: PCT/JP2013/068520
§ 371 (c)(1),
(2) Date: Dec. 30, 2014

(87) PCT Pub. No.: WO2014/007374
PCT Pub. Date: Jan. 9, 2014

(65) Prior Publication Data
US 2015/0152764 A1    Jun. 4, 2015

(30) Foreign Application Priority Data

Jul. 5, 2012 (JP) ................................. 2012-151390
Jul. 26, 2012 (JP) ................................. 2012-165918
Jul. 26, 2012 (JP) ................................. 2012-165919

(51) Int. Cl.
F01N 3/00 (2006.01)
F01N 3/05 (2006.01)
(Continued)

(52) U.S. Cl.
CPC ............. *F01N 3/055* (2013.01); *F01N 3/021* (2013.01); *F01N 3/10* (2013.01); *F01N 3/103* (2013.01); *F01N 13/0097* (2014.06); *F01N 13/1805* (2013.01); *F01N 13/1844* (2013.01); *F01N 13/1855* (2013.01); *F01P 1/02* (2013.01); *F02M 51/005* (2013.01); *F01N 2340/04* (2013.01);
(Continued)

(58) Field of Classification Search
CPC .. F01N 3/055; F01N 13/0097; F01N 13/1805; F01P 2001/026
See application file for complete search history.

(56) References Cited

U.S. PATENT DOCUMENTS 8,516,807 B2    8/2013 Kosaka et al.
2010/0186394 A1    7/2010 Harrison et al.
(Continued)

FOREIGN PATENT DOCUMENTS

JP    10-236392    9/1998
JP    11-280614    10/1999
(Continued)

*Primary Examiner* — Mark Laurenzi
*Assistant Examiner* — Jason Sheppard
(74) *Attorney, Agent, or Firm* — Norris McLaughlin & Marcus, P.A.

(57) ABSTRACT

An engine apparatus includes an exhaust gas purifier configured to purify exhaust gas from an engine. The exhaust gas purifier is mounted on the engine with a longitudinal direction of the exhaust gas purifier being orthogonal to an output shaft of the engine. A cooling fan is disposed on one side surface of the engine that intersects the output shaft. The exhaust gas purifier is supported by a cylinder head at a portion on an upper surface of the engine that is closer to the cooling fan.

7 Claims, 15 Drawing Sheets

(51) Int. Cl.
    *F02M 51/00*     (2006.01)
    *F01N 13/00*     (2010.01)
    *F01N 3/10*     (2006.01)
    *F01P 1/02*     (2006.01)
    *F01N 13/18*     (2010.01)
    *F01N 3/021*     (2006.01)

(52) U.S. Cl.
    CPC ...... *F01N 2560/08* (2013.01); *F01N 2590/08* (2013.01); *F01P 2001/026* (2013.01); *F02M 2200/85* (2013.01); *Y02T 10/20* (2013.01)

(56) References Cited

U.S. PATENT DOCUMENTS

2011/0167808 A1     7/2011   Kosaka et al.
2013/0206121 A1*   8/2013   Nishikawa ......... F02M 25/0754
                                                                                                                                    123/568.13

FOREIGN PATENT DOCUMENTS

| | | |
|---|---|---|
| JP | 2000-145430 | 5/2000 |
| JP | 2010-010352 | 1/2001 |
| JP | 2002-225647 | 8/2002 |
| JP | 2003027922 | 1/2003 |
| JP | 2006271133 | 10/2006 |
| JP | 2010-071176 | 4/2010 |
| JP | 2011-156948 | 8/2011 |
| JP | 2011-163339 | 8/2011 |
| JP | WO 2011135898 A1 * | 11/2011 ......... F02M 37/0047 |

* cited by examiner

ENGINE APPARATUS

TECHNICAL FIELD

The present invention relates to an engine apparatus mounted on a working machine such as a construction civil-engineering machine, an agricultural machine, and an engine generator.

BACKGROUND OF THE INVENTION

Recently, high-order emission control has been applied to diesel engines (hereinafter simply referred to as engine). Accordingly, it has been desired to mount an exhaust gas purifier to purify atmospheric pollutants contained in exhaust gas on a working machine such as a construction civil-engineering machine, an agricultural machine, and an engine generator on which an engine is mounted. As an exhaust gas purifier, a diesel particulate filter (hereinafter referred to as DPF) to collect particulate matter and such substances contained in exhaust gas has been known (see patent documents 1 and 2).

RELATED ART DOCUMENTS

Patent Document 1: Japanese Unexamined Patent Application Publication No. 2000-145430.
Patent Document 2: Japanese Unexamined Patent Application Publication No. 2003-27922.

In the DPF, particulate matter is accumulated in a soot filter with years of service. There is a technique of burning and removing such particulate matter at the time of driving the engine to restore the soot filter. It has been known that restoration of the soot filter occurs when an exhaust gas temperature is equal to or higher than a restorable temperature (approximately 300° C., for example). Consequently, the temperature of exhaust gas passing the DPF is desirably equal to or higher than the restorable temperature. In view of this, since long before, there has been a demand for mounting the DPF at a position where the exhaust gas temperature is high, that is, directly on the engine.

However, when the DPF is attached to the engine, vibration of the engine when driven may be unfortunately transmitted to the exhaust gas purifier directly. Unless an appropriate attachment configuration of the DPF is considered, there is a risk that such vibration will damage a diesel oxidation catalyst and the soot filter accommodated in the DPF.

A space for mounting an engine depends on a kind of a working machine on which the engine is mounted. In most cases, recent demand for weight and size reduction restricts the mounting space (makes the mounting space small). In view of this, when the DPF is directly mounted on the engine, it is required to provide a layout of the DPF as compact as possible.

It is a technical object of the present invention to provide an engine apparatus improved in view of the above-described current circumstances.

SUMMARY OF THE INVENTION

According to the invention, an engine apparatus includes an exhaust gas purifier configured to purify exhaust gas from an engine. The exhaust gas purifier is mounted on the engine with a longitudinal direction of the exhaust gas purifier being orthogonal to an output shaft of the engine. A cooling fan is disposed on one side surface of the engine that intersects the output shaft. The exhaust gas purifier is supported by a cylinder head at a portion on an upper surface of the engine that is closer to the cooling fan.

According to the invention, in the engine apparatus, the exhaust gas purifier is located between a head cover on the cylinder head and the cooling fan.

According to the invention, in the engine apparatus, an electric wiring connector for a detection member with respect to the exhaust gas purifier is disposed on an outer peripheral portion of the exhaust gas purifier that is on a side opposite a side of the cooling fan.

According to the invention, the engine apparatus, the intake manifold and the exhaust manifold are separately disposed on both side surfaces of the engine along the output shaft. A power generator is disposed on a side of the exhaust manifold of the engine whereas an EGR device is disposed on a side of the intake manifold of the engine. A coolant pump is disposed on a side of the cooling fan of the engine. The exhaust gas purifier is located in a range of an installation width of the power generator and the EGR device and above the coolant pump.

According to the invention, an engine apparatus includes an exhaust gas purifier configured to purify exhaust gas from an engine. The exhaust gas purifier is mounted on an upper side of the engine through a mounting base. Two kinds of bracket bodies are coupled to constitute the single mounting base, and the exhaust gas purifier is supported by the bracket bodies.

According to the invention, in the engine apparatus, the bracket bodies have different materials. One of the bracket bodies is a cast-iron bracket body whereas the other of the bracket bodies is a sheet-metal bracket body. The cast-iron bracket body is fastened to a cylinder head of the engine.

According to the invention, in the engine apparatus, the bracket bodies have different materials. One of the bracket bodies is a cast-iron bracket body whereas the other of the bracket bodies is a sheet-metal bracket body. An upper end of the cast-iron bracket body is fastened to the exhaust gas purifier. A lower end of the cast-iron bracket body is fastened to a cylinder head of the engine. A vertically middle portion of the cast-iron bracket body is coupled to an intake manifold of the engine through an auxiliary sheet-metal bracket.

According to the invention, in the engine apparatus, the engine includes injectors on the cylinder head. Fuel piping configured to supply fuel to the injectors and control harnesses are disposed outside of the engine and adjacent to each other. A harness support to which the control harnesses are attached is disposed on the cylinder head and crosses over the fuel piping.

According to the invention, in the engine apparatus, a head cover is disposed on the cylinder head. An intake manifold and an exhaust manifold are separately disposed on both side surfaces of the cylinder head that intersect the output shaft. The injectors are located on the cylinder head outside of the head cover. One end of the harness support is fastened to the head cover. The other end of the harness support is fastened to one of the intake manifold and the exhaust manifold that is on a side of the injectors that is opposite a side of the head cover.

According to the invention, in the engine apparatus, the harness support is integral with a connector attachment portion supporting a relay connector of a branch harness that diverges from the control harnesses.

According to the invention, the engine apparatus includes the exhaust gas purifier to purify exhaust gas from the engine. The exhaust gas purifier is mounted on the engine with the longitudinal direction of the exhaust gas purifier being orthogonal to the output shaft of the engine. The cooling fan is disposed on one side surface of the engine that intersects the output shaft. The exhaust gas purifier is supported by the cylinder head at the portion on the upper surface of the engine that is closer to the cooling fan. Although the engine after assembled with the exhaust gas purifier is to be shipped, the exhaust gas purifier is supported with high rigidity by the cylinder head, which is a highly rigid component of the engine. This prevents vibration or such a factor from damaging the exhaust gas purifier.

In addition, the exhaust gas purifier is disposed on the portion on the upper surface of the engine that is closer to the cooling fan. Consequently, the cylinder head, the intake manifold and the exhaust manifold, for example, are exposed upwardly over a wide range, which facilitates maintenance work in relation to the engine.

According to the invention, the exhaust gas purifier is located above the cylinder head between the head cover and the cooling fan. Consequently, the dead space above the engine between the head cover and the cooling fan is effectively utilized to dispose the exhaust gas purifier. Therefore, even after the engine is assembled with the exhaust gas purifier, the overall height of the engine is reduced as much as possible, thereby making the engine compact.

According to the invention, the electric wiring connector for the detection member with respect to the exhaust gas purifier is disposed on the outer peripheral portion of the exhaust gas purifier that is on the side opposite the side of the cooling fan, as seen in a plan view. Consequently, the electric wiring connector is positioned at a height approximately equal to or lower than the upper end of the exhaust gas purifier. This minimizes or eliminates the influence of the arrangement of the electric wiring connector on the overall height of the engine including the exhaust gas purifier. Accordingly, the overall height of the engine, which is assembled with the exhaust gas purifier, is effectively reduced as much as possible. In this respect as well, the engine is made compact.

According to the invention, the intake manifold and the exhaust manifold are separately disposed on both side surfaces of the engine along the output shaft. The power generator is disposed on the exhaust manifold side of the engine. The EGR device is disposed on the intake manifold side of the engine. The coolant pump is disposed on the cooling fan side of the engine. The exhaust gas purifier is positioned in the range of the installation width of the power generator and the EGR device and above the coolant pump. Accordingly, the overall width of the engine, which is assembled with the exhaust gas purifier, is reduced as much as possible. In this respect as well, the engine is made compact. Moreover, for example, the pipe between the turbosupercharger and the exhaust gas purifier, and the pipe between the turbosupercharger and the EGR device are disposed not to be restricted by the exhaust gas purifier. This improves the degree of freedom of the arrangement of the pipes. Furthermore, the cooling wind from the cooling fan directly blows against the coolant pump, and consequently, the existence of the exhaust gas purifier does not hinder air cooling of the coolant pump.

According to the invention, the engine apparatus includes the exhaust gas purifier to purify exhaust gas from the engine, and the exhaust gas purifier is mounted above the engine through the mounting base. The two kinds of bracket bodies are coupled to constitute the single mounting base. The exhaust gas purifier is supported by both of the bracket bodies. Consequently, as compared with the conventional technique of supporting the exhaust gas purifier using the intake manifold and the exhaust manifold, the restriction of the arrangement of the exhaust gas purifier is lessened. This improves the degree of arrangement freedom of the exhaust gas purifier above the engine. Through the single mounting base made up of the two kinds of bracket bodies, the exhaust gas purifier is mounted above the engine while saving arrangement space and securing sufficient support strength.

According to the invention, the two bracket bodies have different materials. One of the bracket bodies is the cast-iron bracket body whereas the other of the bracket bodies is the sheet-metal bracket body. Since the cast-iron bracket body is fastened to the cylinder head of the engine, the reference position of attachment of the exhaust gas purifier to the engine is set highly accurately. Therefore, even the exhaust gas purifier, which is heavier than a post-processing device such as a muffler, is suitably mounted at a predetermined position.

According to the invention, the two bracket bodies have different materials. One of the bracket bodies is the cast-iron bracket body whereas the other of the bracket bodies is the sheet-metal bracket body. The upper end of the cast-iron bracket body is fastened to the exhaust gas purifier while the lower end of the cast-iron bracket body is fastened to the cylinder head of the engine. Through the auxiliary sheet-metal bracket, the vertically middle portion of the cast-iron bracket body is coupled to the intake manifold of the engine. Consequently, the intake manifold and the cast-iron bracket body are coupled through the auxiliary sheet-metal bracket to secure sufficient coupling strength (rigidity) of the cast-iron bracket body with respect to the engine. This prevents vibration of the engine or such a factor from degrading and damaging the exhaust gas purifier, thus contributing to improvement in durability of the exhaust gas purifier.

According to the invention, the engine includes the injectors on the cylinder head. The fuel piping to supply fuel to the injectors and the control harnesses are disposed outside of the engine and adjacent to each other. The harness support to which the control harnesses are attached is disposed on the cylinder head and crosses over the fuel piping. Consequently, when the control harnesses are mounted and secured on the harness support, the control harnesses are located apart from the cylinder head, which is a high temperature portion of the engine. Also, contact of the fuel piping with the control harnesses is avoided. This minimizes degradation of the control harnesses due to high temperature (heat), and at the same time prevents electrification of the fuel piping. Moreover, the existence of the harness support facilitates recognition of the wiring pathway of the control harnesses at the time of assembling work, thereby serving to improve assembling workability of the control harnesses.

According to the invention, the head cover is disposed on the cylinder head. The intake manifold and the exhaust manifold are separately disposed on both side surfaces of the cylinder head that intersect the output shaft. The injectors are located on the cylinder head outside of the head cover. One end of the harness support is fastened to the head cover. The other end of the harness support is fastened to one of the intake manifold and the exhaust manifold that is on the side of the injectors that is opposite to the head cover side. Consequently, the harness support serves as a bridge reliably crossing over the injectors and the fuel piping. Therefore, the effect is positively obtained. That is, contact of the control harnesses with the cylinder head and the fuel piping is avoided definitely.

According to the invention, the harness support is integral with the connector attachment portion supporting the relay connector of the branch harness that diverges from the control harnesses. Thus, not only the control harnesses but also the relay connector of the branch harness is secured on the harness support. This reduces the number of components and saves space. Also, the wiring group including the control harnesses and the relay connector is suitably attached to the engine.

DETAILED DESCRIPTION OF THE PREFERRED EMBODIMENTS

Figure 1:
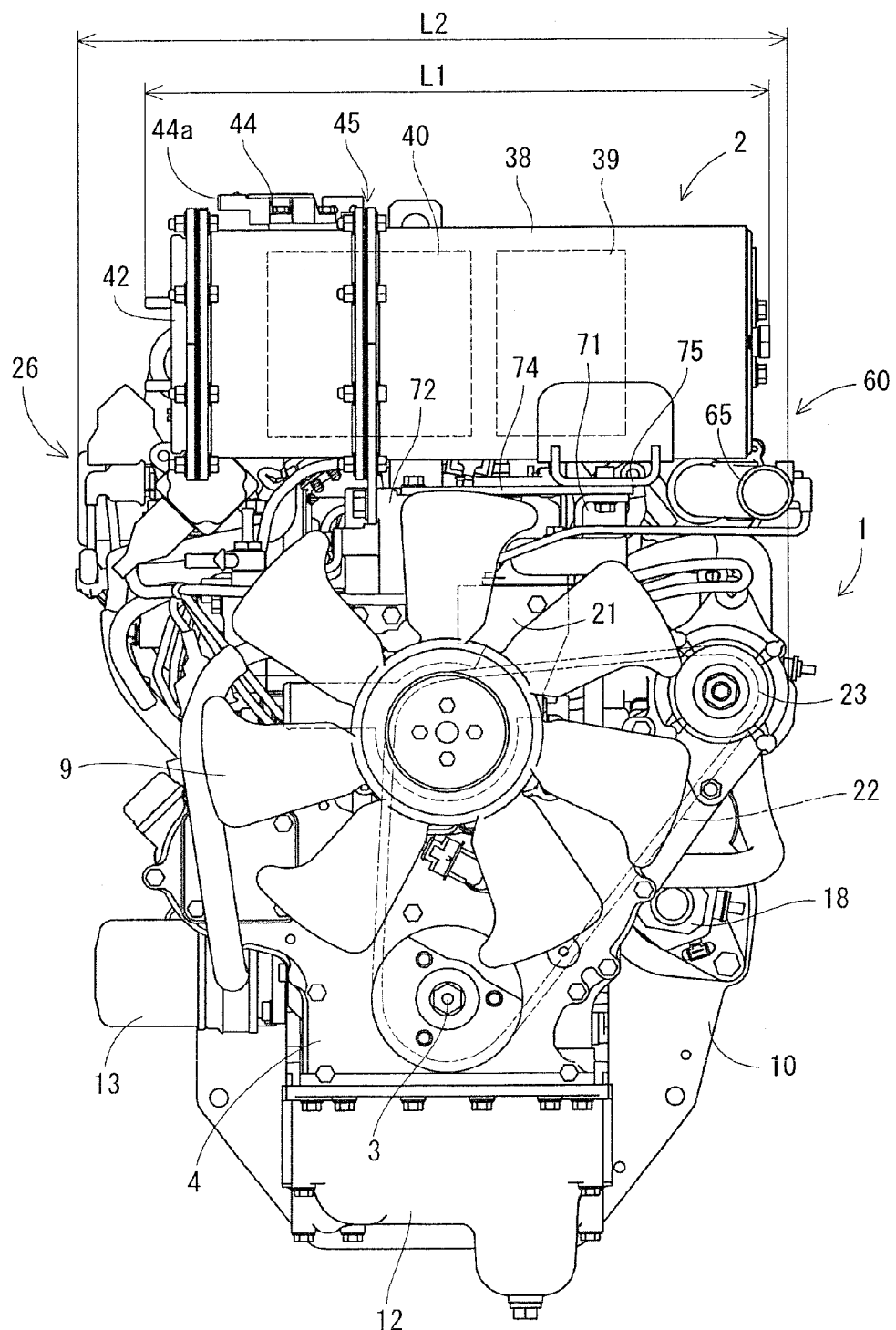
FIG. 1 is a front view of an engine.
Figure 2:
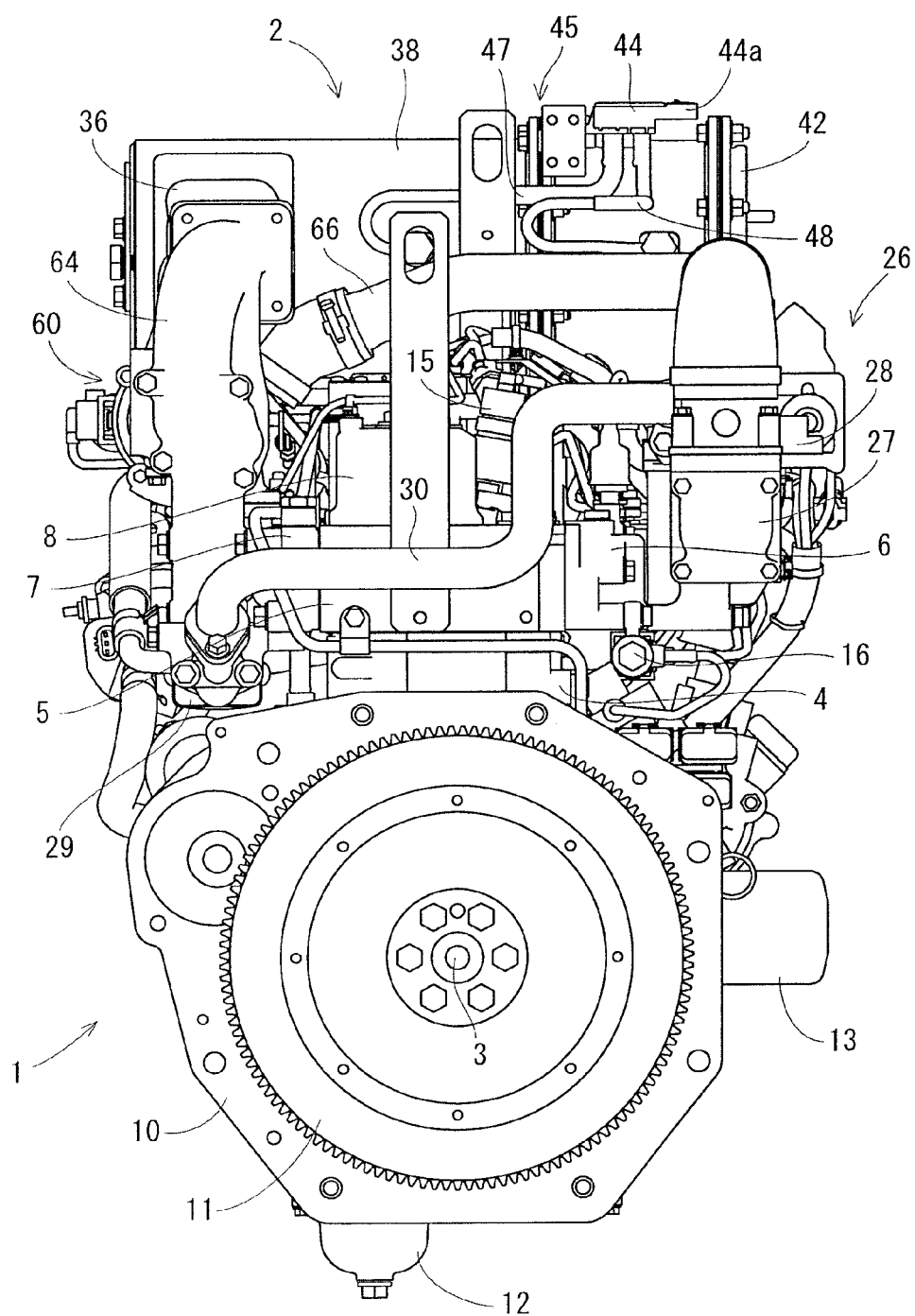
FIG. 2 is a rear view of the engine.
Figure 3:
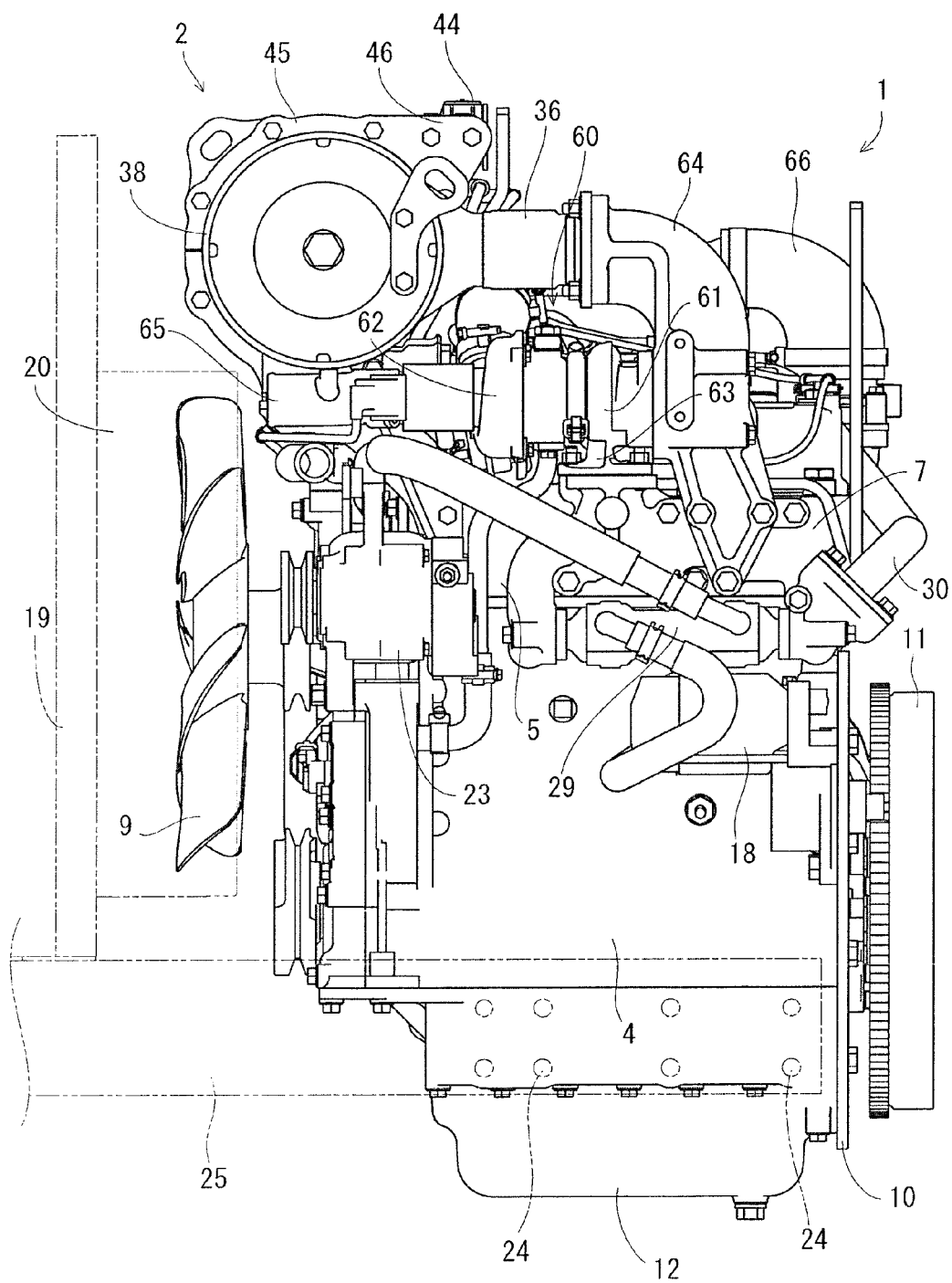
FIG. 3 is a left side view of the engine.

An embodiment of the present invention will be described below with reference to the drawings. First, referring to FIGS. 1 to 8, description will be made on a schematic configuration of a common-rail engine 1. It should be noted that in the following description, both sides in an axial direction of an output shaft 3 (portions on both sides of the output shaft 3) will be referred to as left and right. A side on which a cooling fan 9 is disposed will be referred to as the front side. A side on which a flywheel 11 is disposed will be referred to as the rear side. A side on which an exhaust manifold 7 is disposed will be referred to as the left side. A side on which an intake manifold 6 is disposed will be referred to as the right side. For convenience' sake, these are regarded as references of a relationship of left, right, front, rear, upper, and lower positions in the engine 1.

As shown in FIGS. 1 to 8, the engine 1 as a prime mover is mounted on a working machine such as a construction civil-engineering machine and an agricultural machine. The engine 1 includes a continuous-regeneration exhaust gas purifier 2 (DPF). The exhaust gas purifier 2 removes particulate matter (PM) contained in exhaust gas emitted from the engine 1 and also reduces carbon monoxide (CO) and hydrocarbon (HC) contained in the exhaust gas.

The engine 1 includes a cylinder block 4 accommodating the output shaft 3 (crank shaft) and pistons (not shown). A cylinder head 5 is mounted on the cylinder block 4. The intake manifold 6 is disposed on the right side surface of the cylinder head 5. The exhaust manifold 7 is disposed on the left side surface of the cylinder head 5. That is, the intake manifold 6 and the exhaust manifold 7 are separately located on both side surfaces of the engine 1 along the output shaft 3. A head cover 8 is disposed on the upper surface of the cylinder head 5. The cooling fan 9 is disposed on a side surface of the engine 1 that intersects the output shaft 3, specifically, on the front surface of the cylinder block 4. A mounting plate 10 is disposed on the rear surface of the cylinder block 4. The flywheel 11 is disposed over the mounting plate 10.

The flywheel 11 is axially supported on the output shaft 3. Motive power of the engine 1 is transmitted to an operation unit of the working machine through the output shaft 3. An oil pan 12 is disposed on the lower surface of the cylinder block 4. Lubrication oil in the oil pan 12 is supplied to lubrication portions of the engine 1 through an oil filter 13 disposed on the right side surface of the cylinder block 4.

A fuel supply pump 14 to supply fuel is attached to the right side surface of the cylinder block 4 that is above the oil filter 13 (below the intake manifold 6). The engine 1 includes injectors 15 for three cylinders provided with electromagnetic-switch control fuel injection valves (not shown). Each of the injectors 15 is coupled to a fuel tank (not shown) mounted on the working machine through the fuel supply pump 14, a cylindrical common rail 16, and a fuel filter (not shown).

Fuel in the fuel tank is supplied under pressure from the fuel supply pump 14 to the common rail 16 through the fuel filter (not shown). The high-pressure fuel is accumulated in the common rail 16. By switch control of the fuel injection valves of the injectors 15, the high-pressure fuel in the common rail 16 is injected from the injectors 15 to the respective cylinders of the engine 1. It should be noted that an engine starter 18 is disposed on the mounting plate 10. A pinion gear of the engine starter 18 meshes with a ring gear of the flywheel 11. When the engine 1 is started, torque of the starter 18 makes the ring gear of the flywheel 11 rotate to cause the output shaft 3 to start rotating (to execute so-called cranking).

A coolant pump 21 is disposed on the front side of the cylinder head 5 (on the cooling fan 9 side) to be coaxial with a fan shaft of the cooling fan 9. An alternator 23 is disposed on the left side of the engine 1, specifically on the left side of the coolant pump 21. The alternator 23 serves as a generator to generate electricity by motive power of the engine 1. Through a cooling fan driving V belt 22, rotation of the output shaft 3 drives not only the cooling fan 9 but also the coolant pump 21 and the alternator 23. A radiator 19 (see FIGS. 3 and 4) mounted on the working machine contains coolant. The coolant pump 21 is driven to supply the coolant to the cylinder block 4 and the cylinder head 5, thereby cooling the engine 1.

Engine leg attachment portions 24 are disposed on the left and right side surfaces of the oil pan 12. Engine legs (not shown) including rubber vibration isolators are respectively fastened by bolts to the engine leg attachment portions 24. In this embodiment, the oil pan 12 is clamped by a pair of left and right engine support chassis 25 in the working machine. The engine leg attachment portions 24 on the oil pan 12 side are fastened by bolts to the engine support chassis 25. Thus, both the engine support chassis 25 of the working machine support the engine 1.

A radiator 19 stands on the pair of left and right engine support chassis 25 and is located on the front side of the engine 1. A fan shroud 20 is attached to the rear surface of the radiator 19. The fan shroud 20 covers the outside (outer peripheral side) of the cooling fan 9 and makes the radiator 19 and the cooling fan 9 communicate with each other. The cooling fan 9 is rotated to blow the cooling wind against the radiator 19. Then, the cooling wind flows from the radiator 19 to the engine 1 through the fan shroud 20.

Figure 4:
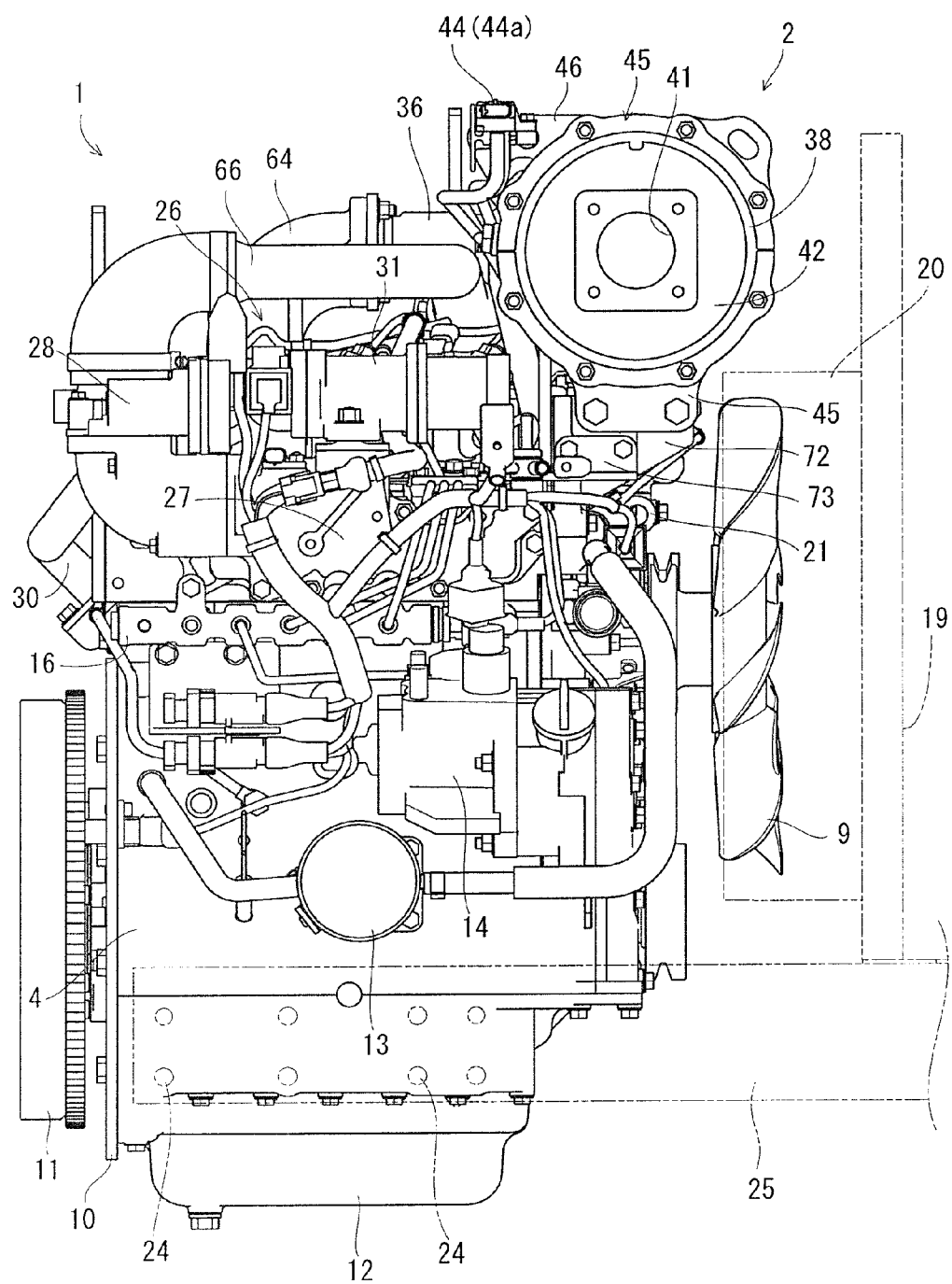
FIG. 4 is a right side view of the engine.
Figure 5:
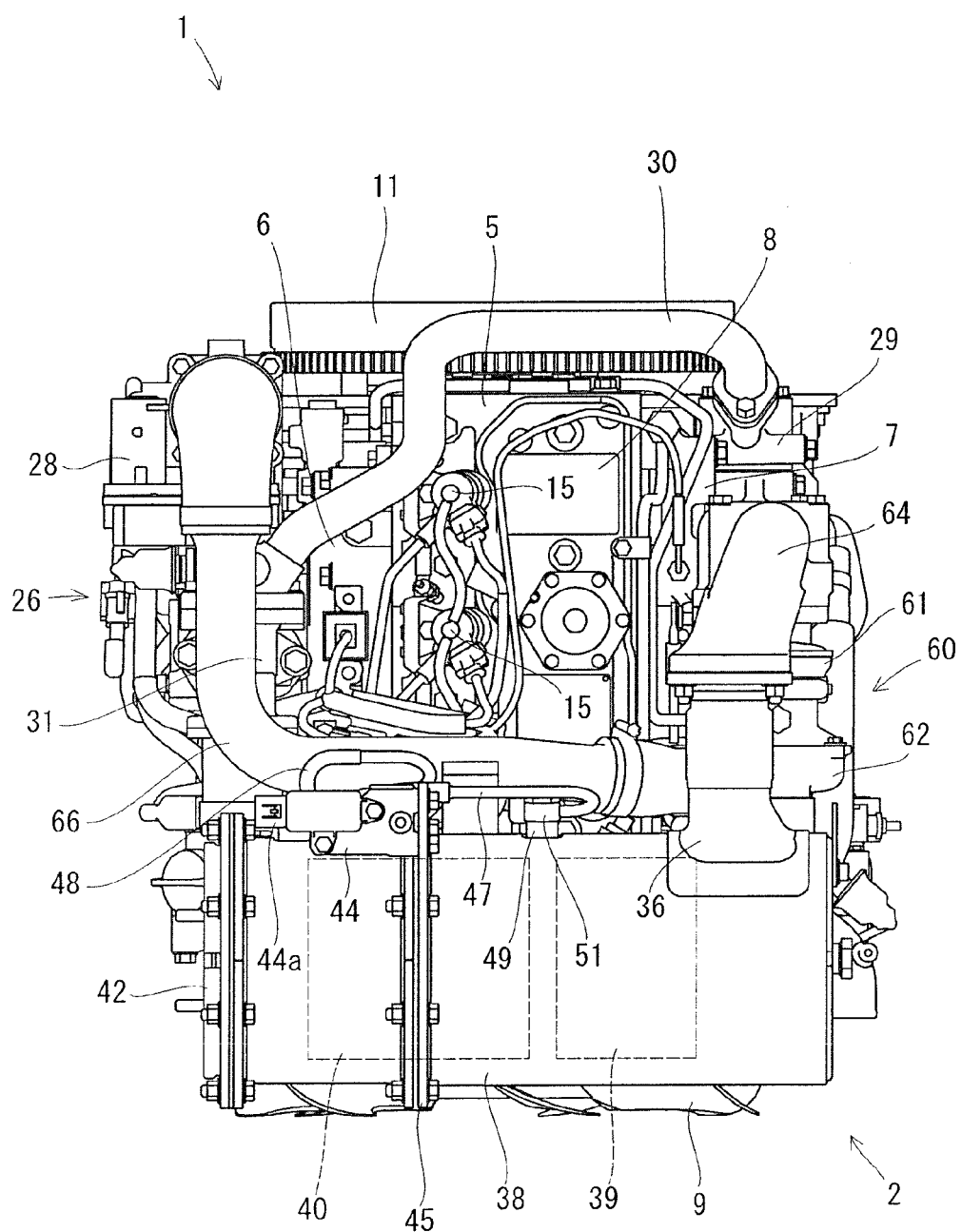
FIG. 5 is a plan view of the engine.
Figure 6:
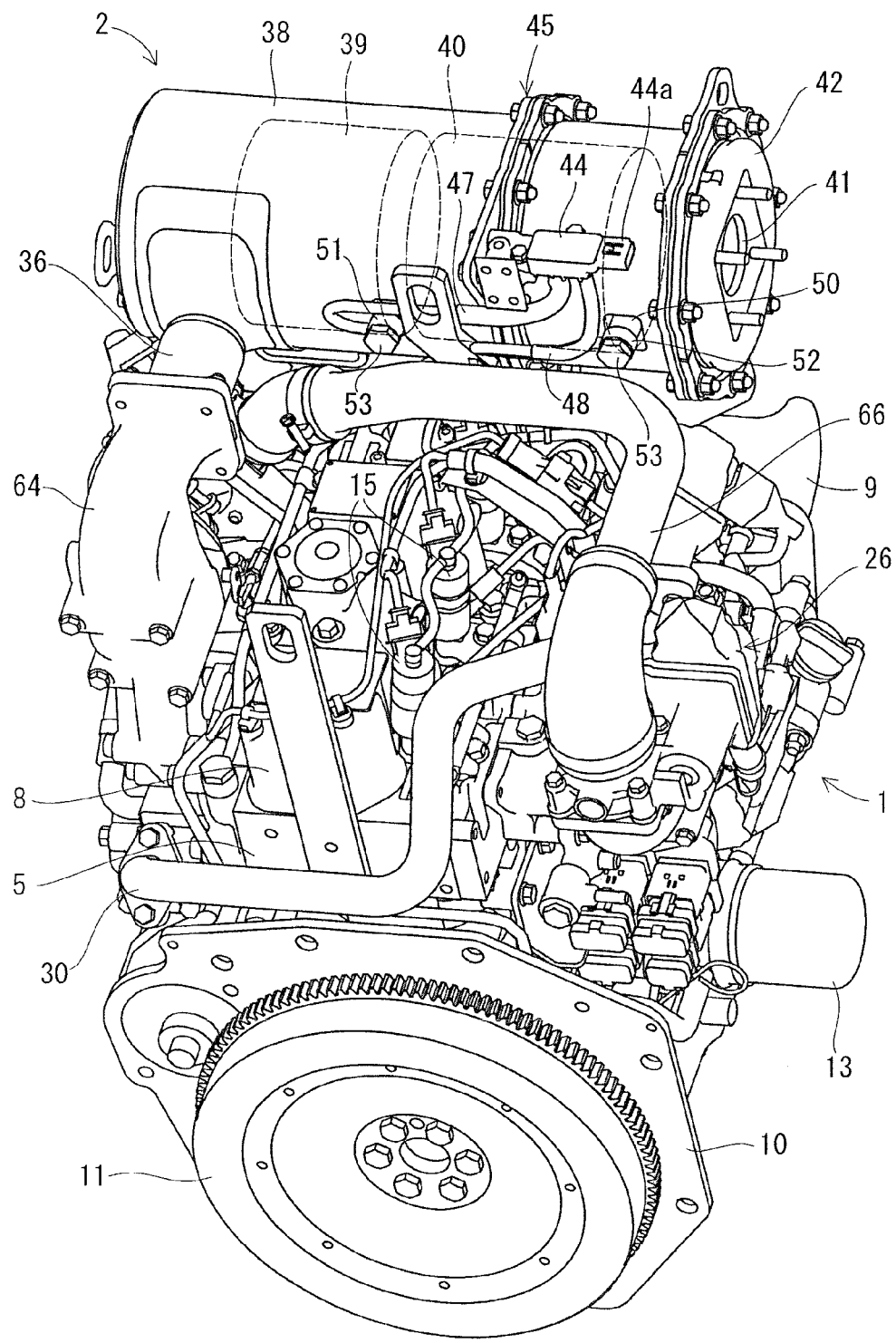
FIG. 6 is an upper rear perspective view of the engine.
Figure 7:
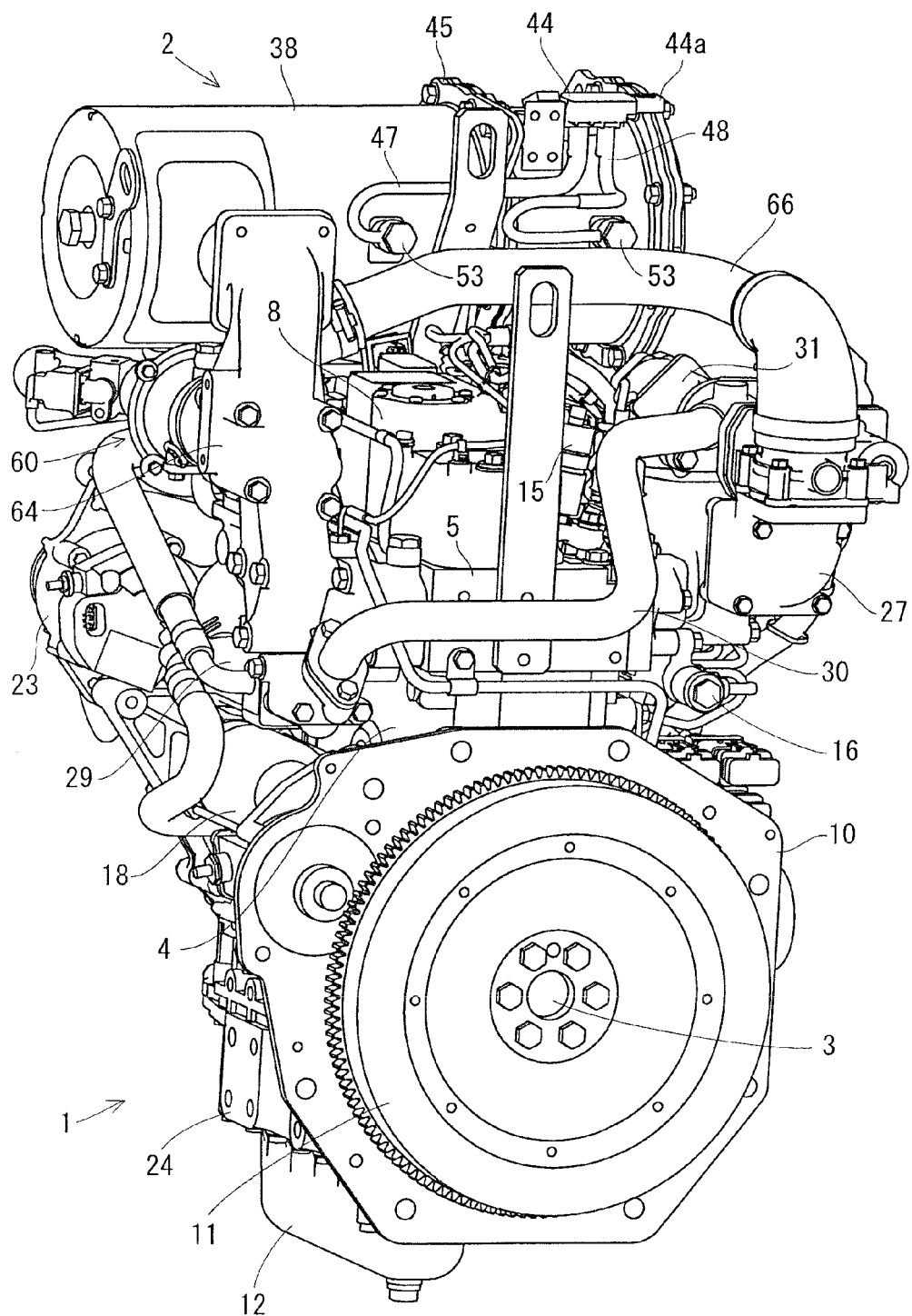
FIG. 7 is a rear perspective view of the engine.
Figure 8:
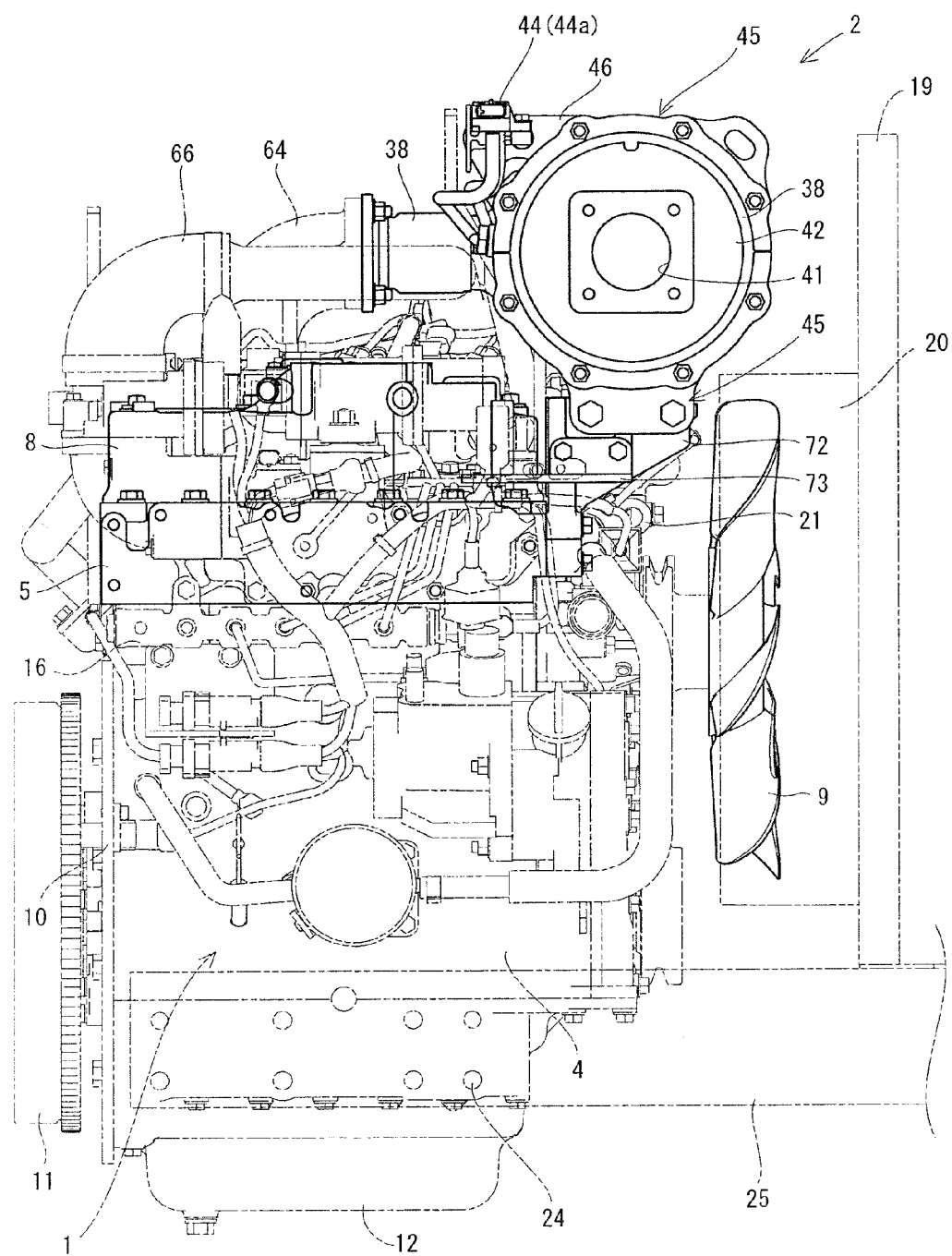
FIG. 8 is a right side view of a cooling fan, a head cover, and an exhaust gas purifier, illustrating a positional relationship of the cooling fan, the head cover, and the exhaust gas purifier.

As shown in FIGS. 4 to 6, an air cleaner (not shown) is coupled to an inlet portion of the intake manifold 6 through an EGR device 26 (exhaust gas recirculation device). The EGR device 26 is mainly disposed on the right side of the engine 1, specifically, on the right side of the cylinder head 5. Fresh air (outside air) drawn into the air cleaner is dusted and purified by the air cleaner. Then, through a compressor case 62 of a turbosupercharger 60 (which will be described in detail later) and the EGR device 26, the fresh air is sent to the intake manifold 6 and supplied to the cylinders of the engine 1.

The EGR device 26 includes an EGR main body case 27, an intake throttle member 28, a recirculation exhaust gas pipe 30, and an EGR valve member 31. The EGR main body case 27 mixes part of exhaust gas of the engine 1 (EGR gas) with fresh air and supplies the mixture to the intake manifold 6. The intake throttle member 28 communicates the EGR main body case 27 with the compressor case 62. The recirculation exhaust gas pipe 30 is coupled to the exhaust manifold 7 through an EGR cooler 29. The EGR valve member 31 communicates the EGR main body case 27 with the recirculation exhaust gas pipe 30.

Specifically, the intake throttle member 28 is coupled to the intake manifold 6 through the EGR main body case 27. An outlet side of the recirculation exhaust gas pipe 30 is coupled to the EGR main body case 27. An inlet side of the recirculation exhaust gas pipe 30 is coupled to the exhaust manifold 7 through the EGR cooler 29. An opening degree of an EGR valve in the EGR valve member 31 is controlled to regulate an amount of supply of EGR gas to the EGR main body case 27. It should be noted that the EGR main body case 27 is detachably fastened by bolts to the intake manifold 6.

In the above-described configuration, fresh air is supplied from the air cleaner into the EGR main body case 27 through the compressor case 62 and the intake throttle member 28 whereas the EGR gas is supplied from the exhaust manifold 7 into the EGR main body case 27. After the fresh air from the air cleaner and the EGR gas from the exhaust manifold 7 is mixed in the EGR main body case 27, the mixed gas is supplied to the intake manifold 6. Part of exhaust gas emitted from the engine 1 to the exhaust manifold 7 is made to flow back from the intake manifold 6 to the engine 1. This lowers the maximum combustion temperature at the time of high-load driving, thus decreasing an emission volume of NOx (nitrogen oxide) from the engine 1.

The turbosupercharger 60 is disposed on the left side of the cylinder head 5 and above the exhaust manifold 7. The turbosupercharger 60 includes a turbine case 61 and the compressor case 62. The turbine case 61 houses a turbine wheel, and the compressor case 62 houses a blower wheel. An exhaust gas intake pipe 63 of the turbine case 61 is coupled to an outlet portion of the exhaust manifold 7. The exhaust gas purifier 2 is coupled to an exhaust gas discharge pipe 64 of the turbine case 61. Specifically, exhaust gas discharged from the cylinders of the engine 1 to the exhaust manifold 7 is emitted to the outside through such components as the turbosupercharger 60 and the exhaust gas purifier 2.

An air intake side of the compressor case 62 is coupled to an air discharge side of the air cleaner through an air duct 65. An air discharge side of the compressor case 62 is coupled to the intake manifold 6 through a supercharge pipe 66 and the EGR device 26. That is, the fresh air dusted by the air cleaner is sent from the compressor case 62 to the EGR device 26 through the supercharge pipe 66, and then supplied to the cylinders of the engine 1.

Next, the exhaust gas purifier 2 will be described. The exhaust gas purifier 2 includes a purification casing 38 provided with the purification inlet pipe 36. Inside of the purification casing 38, a diesel oxidation catalyst 39 and a soot filter 40 are arranged in series in a direction of movement of exhaust gas. The diesel oxidation catalyst 39 is, for example, platinum, which generates nitrogen dioxide ($NO_2$). The soot filter 40 has a honeycomb structure to continuously oxidizes and removes collected particulate matter (PM) at relatively low temperature. The diesel oxidation catalyst 39 and the soot filter 40 are regarded as a gas purification filter accommodated in the purification casing 38. It should be noted that, for example, a muffler or a tail pipe is coupled to an exhaust gas outlet 41 of the purification casing 38 through an exhaust pipe. Thus, the exhaust gas is emitted from the exhaust gas outlet 41 to the outside through the muffler or tail pipe.

In the above-described configuration, nitrogen dioxide ($NO_2$) generated by oxidation function of the diesel oxidation catalyst 39 is drawn into the soot filter 40. Particulate matter in exhaust gas of the engine 1 is collected by the soot filter 40, and the particulate matter is continuously oxidized and removed by nitrogen dioxide ($NO_2$). This ensures not only removal of the particulate matter (PM) from the exhaust gas of the engine 1 but also decreases of the carbon monoxide (CO) content and the hydrocarbon (HC) content in the exhaust gas of the engine 1.

The purification inlet pipe 36 is disposed on the outer peripheral portion of the purification casing 38 on the exhaust upstream side. A lid member 42 is welded on an end portion of the purification casing 38 at the exhaust downstream side. The end portion of the purification casing 38 at the exhaust downstream side is covered with the lid member 42. An exhaust gas outlet 41 is opened approximately in the center of the lid member 42.

An exhaust pressure sensor 44 is attached to the purification casing 38. The exhaust pressure sensor 44 detects a difference between pressures of exhaust gas on the upstream side and the downstream side of the soot filter 40. The exhaust pressure sensor 44 converts the pressure difference of the exhaust gas into electric signals to be output to the engine controller (not shown). Based on the pressure difference of the exhaust gas between the upstream side and the downstream side of the soot filter 40, an amount of accumulation of particulate matter in the soot filter 40 is calculated to grasp a state of clogging in the soot filter 40.

As shown in FIGS. 1 to 8, a sensor fastening portion 46 with through holes is disposed on an intermediate clamping flange 45 of the purification casing 38 and located on an outer peripheral portion of the purification casing 38 that is on a side opposite the side of the cooling fan 9 (on the head cover 8 side). The exhaust pressure sensor 44 integral with an electric wiring connector 44a is fastened by bolts to the sensor fastening portion 46 of the intermediate clamping flange 45. That is, the electric wiring connector 44a for the exhaust pressure sensor 44 with respect to the exhaust gas purifier 2 is located on the outer peripheral portion of the exhaust gas purifier 2 that is on the side opposite the side of the cooling fan 9. The exhaust pressure sensor 44 is equivalent to a detection member.

One end of an upstream-side sensor pipe 47 and one end of a downstream-side sensor pipe 48 are coupled to the exhaust pressure sensor 44. The purification casing 38 is provided with upstream-side and downstream-side sensor pipe bosses 49 and 50 with the soot filter 40 in the purification casing 38 interposed between the sensor pipe bosses 49 and 50. Through pipe fitting bolts 53, fastening bosses 51 and 52 disposed on the other end of the sensor pipe 47 and the other end of the sensor pipe 48 are respectively fastened to the sensor pipe bosses 49 and 50.

In the above-described configuration, a difference between an exhaust gas pressure at the upstream (inflow) side of the soot filter 40 and an exhaust gas pressure at the downstream (outflow) side of the soot filter 40 (differential pressure of the exhaust gas) is detected by the exhaust pressure sensor 44. The residual amount of particulate matter in the exhaust gas collected by the soot filter 40 is proportional to the differential pressure of the exhaust gas. Consequently, when the residual amount of particulate matter in the soot filter 40 becomes equal to or larger than a predetermined value, restoration control (control for increasing the exhaust gas temperature, for example) is executed based on a detection result of the exhaust pressure sensor 44. Thus, the amount of the particulate matter in the soot filter 40 is reduced. Moreover, when the residual amount of the particulate matter further increases beyond a restoration controllable range, the purification casing 38 is detached and disassembled to clean the soot filter 40. Thus, maintenance work is performed to manually remove the particulate matter.

As described above, the electric wiring connector 44a for the exhaust pressure sensor 44 with respect to the exhaust gas purifier 2 is located on the outer peripheral portion of the exhaust gas purifier 2 that is on the side opposite the side of the cooling fan 9. This allows the electric wiring connector 44a to be positioned at a height approximately equal to or lower than an upper end of the exhaust gas purifier 2. Consequently, with respect to the overall height of the engine 1 including the exhaust gas purifier 2, an influence of the arrangement of not only the electric wiring connector 44a but also the exhaust pressure sensor 44 is minimized or eliminated. This arrangement is effective for reducing the overall height of the engine 1 assembled with the exhaust gas purifier 2 as much as possible, which contributes to size reduction of the engine 1.

Also, the exhaust pressure sensor 44 itself is located on the outer peripheral portion of the exhaust gas purifier 2 that is on the side opposite the side of the cooling fan 9. Therefore, the cooling wind from the cooling fan 9 is hindered from blowing against the exhaust pressure sensor 44 and sensor pipes 47 and 48. This avoids cooling of the exhaust gas in the exhaust pressure sensor 44 and the sensor pipes 47 and 48 by the cooling wind from the cooling fan 9 as much as possible. Thus, erroneous detection of the exhaust pressure sensor 44 is prevented to improve accuracy of restoration control for decreasing the amount of particulate matter in the soot filter 40 (to execute the restoration control appropriately).

As shown in FIGS. 5 to 8, the exhaust gas purifier 2 is supported on the cylinder head 5 on a portion of the upper side of the engine 1 that is closer to the cooling fan 9. Therefore, although the engine 1 after assembled with the exhaust gas purifier 2 is to be shipped, the exhaust gas purifier 2 is supported with high rigidity using the cylinder head 5, which is a highly rigid component of the engine 1. This prevents damage to the exhaust gas purifier 2 due to vibration, for example. Furthermore, the exhaust gas purifier 2 is communicable with the exhaust manifold 7 at close range to maintain the exhaust gas purifier 2 at appropriate temperature. This ensures maintenance of high purification performance of the exhaust gas. As a result, the exhaust gas purifier 2 is reduced in size. In addition, since the exhaust gas purifier 2 is located on the portion of the upper side of the engine 1 that is closer to the cooling fan 9, the cylinder head 5, the intake manifold 6, and the exhaust manifold 7 are exposed upwardly over a wide range. This facilitates maintenance work in relation to the engine 1.

In this embodiment, a space above the engine 1 between the head cover 8 and the cooling fan 9 exists as a dead space. Consequently, the exhaust gas purifier 2 is located above the engine 1 between the head cover 8 and the cooling fan 9 with the longitudinal direction of the exhaust gas purifier 2 being orthogonal to the output shaft 3 of the engine 1. Therefore, even though the engine 1 is assembled with the exhaust gas purifier 2, the overall height is made as low as possible. The dead space between the head cover 8 and the cooling fan 9 is effectively utilized to make the engine 1 compact.

In this embodiment, the outer peripheral side of the cooling fan 9 is surrounded by the fan shroud 20 to hinder the cooling wind from the cooling fan 9 from directly blowing against the exhaust gas purifier 2. Therefore, the exhaust gas temperature in the exhaust gas purifier 2 is prevented from being decreased by the cooling wind from the cooling fan 9 as much as possible. Thus, the exhaust gas purification performance of the exhaust gas purifier 2 is maintained appropriately. However, the positional relationship is such that the coolant pump 21 is opposed to the cooling fan 9, and the cooling wind from the cooling fan 9 directly blows against the coolant pump 21. Consequently, the existence of the exhaust gas purifier 2 does not hinder air cooling of the coolant pump 21.

As shown in a front view of FIG. 1, the exhaust gas purifier 2 is located within an installation width L2 of the alternator 23 as a power generator and the EGR device 26 and above the coolant pump 21. In other words, a length L1 of the exhaust gas purifier 2 in the longitudinal direction is smaller than the installation width L2 corresponding to the overall width of the engine 1. The exhaust gas purifier 2 is located above the coolant pump 21 within a range of the installation width L2 corresponding to the overall width of the engine 1. Therefore, even though the engine 1 is assembled with the exhaust gas purifier 2, the overall width of the engine 1 is made as small as possible. This also contributes to size reduction of the engine 1.

Moreover, the pipe 64 between the turbosupercharger 60 and the exhaust gas purifier 2, and the pipe 66 between the turbosupercharger 60 and the EGR device 26 are arranged not to be restricted by the exhaust gas purifier 2. This improves a degree of freedom of the arrangement of the pipes 64 and 66.

Next, a configuration of assembling the engine 1 with the exhaust gas purifier 2 will be described. The exhaust gas discharge pipe 64 is fastened by bolts to the exhaust manifold 7 and the turbine case 61 of the turbosupercharger 60. The purification inlet pipe 36 of the exhaust gas purifier 2 (purification casing 38) is fastened by bolts to the exhaust gas discharge pipe. Through the exhaust gas discharge pipe 64, exhaust gas of the exhaust manifold 7 is supplied from the turbine case 61 of the turbosupercharger 60 to the exhaust gas purifier 2. The exhaust gas discharge pipe 64 also serves as a casing support to support the exhaust gas purifier 2.

Figure 9:
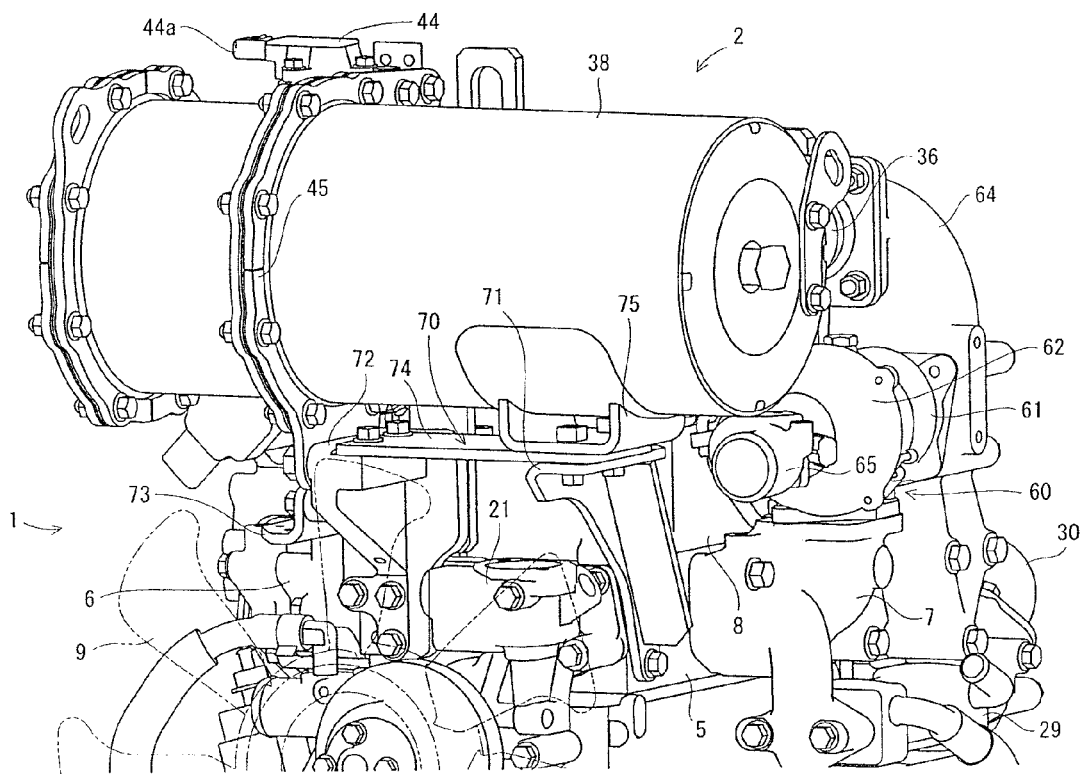
FIG. 9 is an enlarged left front perspective view of the engine and the exhaust gas purifier.
Figure 10:
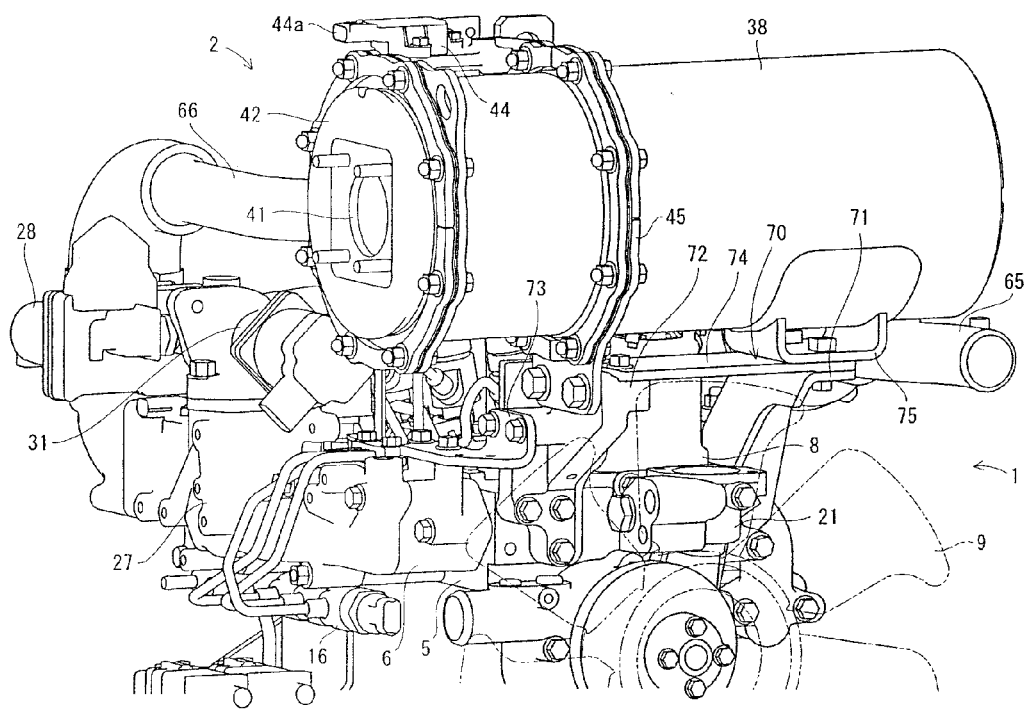
FIG. 10 is an enlarged right front perspective view of the engine and the exhaust gas purifier.
Figure 11:
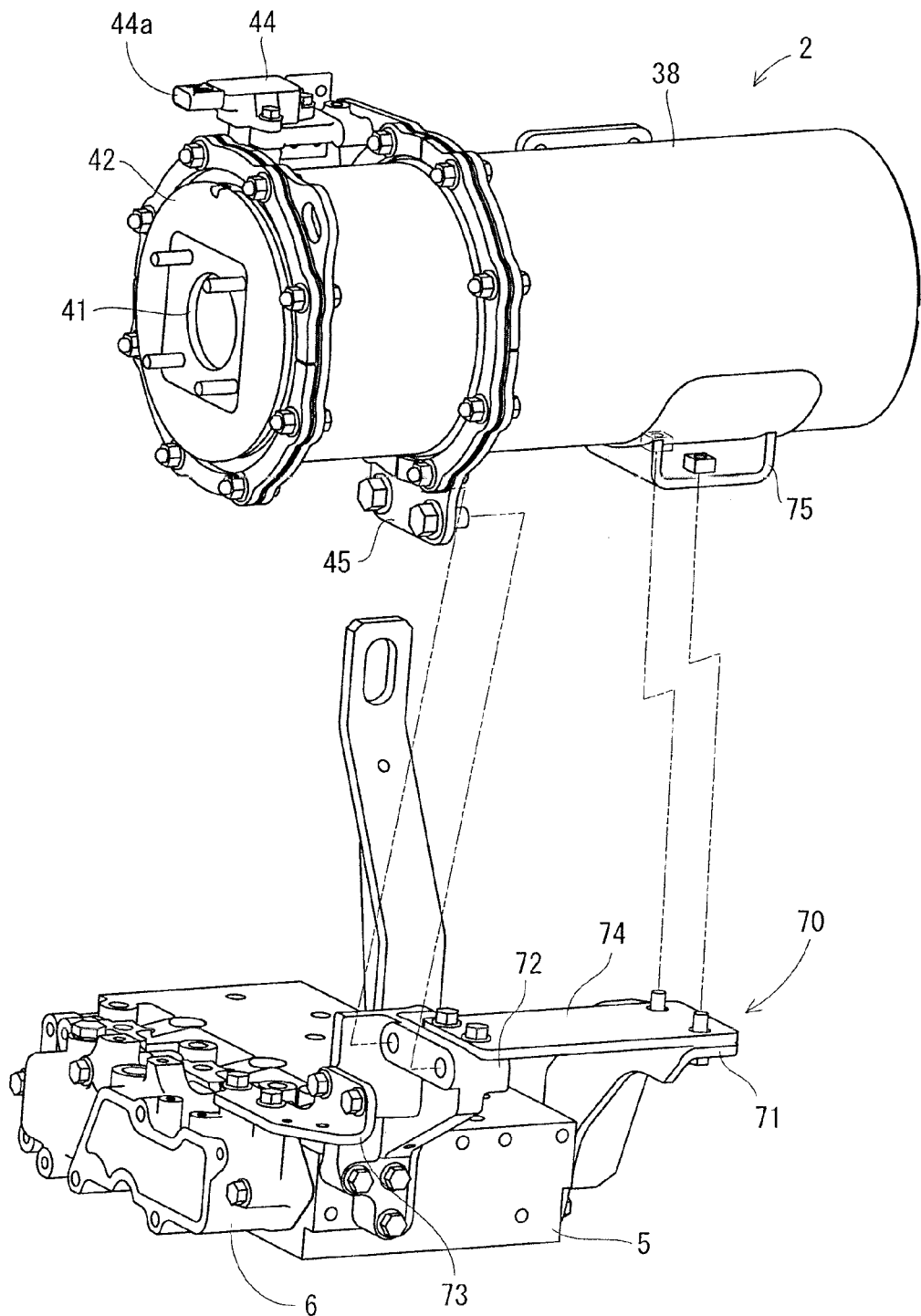
FIG. 11 is an exploded perspective view of the exhaust gas purifier to be mounted on the engine.

As shown in FIGS. 9 to 11 in detail, the engine 1 includes an inlet-side bracket body 71 and an outlet-side bracket body 72 to support and secure the exhaust gas purifier 2. In this embodiment, the inlet-side bracket body 71 is made of sheet metal, and the outlet-side bracket body 72 is made of cast iron. The inlet-side bracket body 71 corresponds to a sheet-metal bracket body, and the outlet-side bracket body 72 corresponds to a cast-iron bracket body. That is, a combination of the inlet-side bracket body 71 and the outlet-side bracket body 72 corresponds to two kinds of bracket bodies. In this embodiment, as described above, materials of the bracket bodies 71 and 72 are respectively sheet metal and cast iron, and different from each other. Materials of the bracket bodies 71 and 72 should not be limited to cast iron or sheet metal, and may be other materials such as die cast products.

A lower end of the inlet-side bracket body 71 is fastened by bolts to the front portion of the left side surface of the cylinder head 5. A lower end of the outlet-side bracket body 72 is fastened by bolts to the front surface of the cylinder head 5, and also, a vertically middle portion of the outlet-side bracket body 72 is fastened by bolts to the upper surface of the intake manifold 6 through a coupling bracket 73. The coupling bracket 73 is made of sheet metal similarly to the inlet-side bracket body 71, and corresponds to an auxiliary sheet-metal bracket. The inlet-side bracket body 71 and the outlet-side bracket body 72 stand on the front side of the cylinder head 5.

As described above, the lower end of the outlet-side bracket body 72 is fastened to the front surface side of the cylinder head 5 to set a mounting reference position of the exhaust gas purifier 2 with respect to the engine 1 highly accurately. Therefore, although the exhaust gas purifier 2 is heavier than a post-processing device such as a muffler, the exhaust gas purifier 2 is mounted at a predetermined position appropriately. Furthermore, the intake manifold 6 and the outlet-side bracket body 72 are coupled through the coupling bracket 73. Thus, sufficient coupling strength (rigidity) of the outlet-side bracket body 72 with respect to the engine 1 is secured to prevent degradation of and damage to the exhaust gas purifier 2 due to vibration of the engine 1. This improves durability of the exhaust gas purifier 2.

A reinforcement plate 74 is disposed on an upper end of the inlet-side bracket body 71. A distal end portion (right end portion) of the reinforcement plate 74 of the inlet-side bracket body 71 is coupled to an upper end of the outlet-side bracket body 72. That is, the inlet-side bracket body 71 and the outlet-side bracket body 72 are coupled through the reinforcement plate 74 to constitute a single mounting base 70.

A receiving bracket 75 is fastened by bolts to a proximal end portion (left side portion) of the reinforcement plate 74 secured on the upper end of the inlet-side bracket body 71. The receiving bracket 75 is welded on the outer peripheral surface of the purification casing 38 on the exhaust downstream side. The upper end of the outlet-side bracket body 72 is fastened by bolts to the intermediate clamping flange 45 of the purification casing 38. Through the inlet-side bracket body 71 and the outlet-side bracket body 72, which constitute the single mounting base 70, the exhaust gas purifier 2 (purification casing 38) is supported on the cylinder head 5 of the engine 1. Therefore, as compared with the conventional technique of supporting the exhaust gas purifier utilizing the intake and exhaust manifolds, restriction of the arrangement of the exhaust gas purifier 2 is lessened. This improves a degree of freedom of the arrangement of the exhaust gas purifier 1 above the engine 1. Through the single mounting base 70 made up of the inlet-side bracket body 71 and the outlet-side bracket body 72, the exhaust gas purifier 2 is mounted above the engine 1 while saving the mounting space and securing sufficient support strength.

As is apparent from the above description and FIGS. 1 to 8, the engine apparatus includes the exhaust gas purifier 2 to purify exhaust gas from the engine 1. The exhaust gas purifier 2 is mounted on the engine 1 with the longitudinal direction of the exhaust gas purifier 2 being orthogonal to the output shaft 3 of the engine 1. The cooling fan 9 is disposed on one side surface of the engine 1 that intersects the output shaft 3. The exhaust gas purifier 2 is supported by the cylinder head 5 at the portion on the upper surface of the engine 1 that is closer to the cooling fan 9. Although the engine 1 after assembled with the exhaust gas purifier 2 is to be shipped, the exhaust gas purifier 2 is supported with high rigidity by the cylinder head 5, which is a highly rigid component of the engine 1. This prevents vibration or such a factor from damaging the exhaust gas purifier 2.

Moreover, the exhaust gas purifier 2 communicates with the exhaust manifold 7 at close range. This facilitates maintenance of the exhaust gas purifier 2 at appropriate temperature and ensures maintenance of high performance of exhaust gas purification. As a result, the exhaust gas purifier 2 is reduced in size. In addition, the exhaust gas purifier 2 is disposed on the portion on the upper surface of the engine 1 that is closer to the cooling fan 9. Consequently, the cylinder head 5, the intake manifold 6 and the exhaust manifold 7 are exposed upwardly over a wide range, which facilitates maintenance work in relation to the engine 1.

As is apparent from the above description and FIGS. 5 to 8, the exhaust gas purifier 2 is located above the cylinder head 5 between the head cover 8 and the cooling fan 9. Consequently, the dead space above the engine 1 between the head cover 8 and the cooling fan 9 is effectively utilized to dispose the exhaust gas purifier 2. Therefore, even after the engine 1 is assembled with the exhaust gas purifier 2, the overall height of the engine 1 is reduced as much as possible, thereby making the engine 1 compact.

As is apparent from the above description and FIGS. 1 to 4, the electric wiring connector 44a for the detection member 44 with respect to the exhaust gas purifier 2 is disposed on the outer peripheral portion of the exhaust gas purifier 2 that is on the side opposite the side of the cooling fan 9. Consequently, the electric wiring connector 44a is positioned at a height approximately equal to or lower than the upper end of the exhaust gas purifier 2. This minimizes or eliminates the influence of the arrangement of the electric wiring connector 44a on the overall height of the engine 1 including the exhaust gas purifier 2. Accordingly, the overall height of the engine 1, which is assembled with the exhaust gas purifier 2, is effectively reduced as much as possible. In this respect as well, the engine 1 is made compact.

As is apparent from the above description and FIGS. 1 to 4, the intake manifold 6 and the exhaust manifold 7 are separately disposed on both side surfaces of the engine 1 along the output shaft 3. The power generator 23 is disposed on the exhaust manifold 7 side of the engine 1. The EGR device 26 is disposed on the intake manifold 6 side of the engine 1. The coolant pump 21 is disposed on the cooling fan 9 side of the engine 1. The exhaust gas purifier 2 is positioned in the range of the installation width of the power generator 23 and the EGR device 26 and above the coolant pump 21. Accordingly, the overall width of the engine 1, which is assembled with the exhaust gas purifier 2, is reduced as much as possible. In this respect as well, the engine 1 is made compact. Moreover, for example, the pipe 64 between the turbosupercharger 60 and the exhaust gas purifier 2, and the pipe 66 between the turbosupercharger 60 and the EGR device 26 are disposed not to be restricted by the exhaust gas purifier 2. This improves the degree of freedom of the arrangement of the pipes 64 and 66. Furthermore, the cooling wind from the cooling fan 9 directly blows against the coolant pump 21, and consequently, the existence of the exhaust gas purifier 2 does not hinder air cooling of the coolant pump 21.

When a DPF is attached to an engine, vibration of the engine when driven may be unfortunately transmitted to an exhaust gas purifier directly. Unless an appropriate attachment configuration of the DPF is considered, there is a risk that such vibration will damage a diesel oxidation catalyst and a soot filter accommodated in the DPF.

In this respect, Japanese Unexamined Patent Application Publication No. 2010-71176 discloses that an intake manifold and an exhaust manifold are separately disposed on both sides of a cylinder head of an engine with an exhaust gas purifier being coupled to the intake manifold and the exhaust manifold above the engine. With this configuration, the exhaust gas purifier is supported with high rigidity using the intake manifold and the exhaust manifold, which are highly rigid components of the engine. This advantageously prevents vibration or such a factor from damaging the exhaust gas purifier.

However, in the configuration of Japanese Unexamined Patent Application Publication No. 2010-71176, an exhaust gas inlet pipe of the exhaust gas purifier is coupled to an outlet portion of the exhaust manifold. Obviously, the location of the exhaust gas purifier above the engine is restricted by a position of the outlet portion of the exhaust manifold. That is, there has been yet room for improvement in the configuration of patent document 3 in a respect of a low degree of arrangement freedom of the exhaust gas purifier above the engine.

In the above-described embodiment, however, the engine apparatus includes the exhaust gas purifier 2 to purify exhaust gas from the engine 1, and the exhaust gas purifier 2 is mounted above the engine 1 through the mounting base 70. The two kinds of bracket bodies 71 and 72 are coupled to constitute the single mounting base 70. The exhaust gas purifier 2 is supported by both of the bracket bodies 71 and 72. Consequently, as compared with the above-described conventional technique of supporting the exhaust gas purifier using the intake manifold and the exhaust manifold, the restriction of the arrangement of the exhaust gas purifier 2 is lessened. This improves the degree of arrangement freedom of the exhaust gas purifier 2 above the engine 1. Through the single mounting base 70 made up of the two kinds of bracket bodies 71 and 72, the exhaust gas purifier 2 is mounted above the engine 1 while saving arrangement space and securing sufficient support strength.

As is apparent from the above description and FIGS. 9 to 11, the two bracket bodies 71 and 72 have different materials. One of the bracket bodies is the cast-iron bracket body 72 whereas the other of the bracket bodies is the sheet-metal bracket body 71. Since the cast-iron bracket body 72 is fastened to the cylinder head 5 of the engine 1, the reference position of attachment of the exhaust gas purifier 2 to the engine 1 is set highly accurately. Therefore, even the exhaust gas purifier 2, which is heavier than a post-processing device such as a muffler, is suitably mounted at a predetermined position.

As is apparent from the above description and FIGS. 9 to 11, the two bracket bodies 71 and 72 have different materials. One of the bracket bodies is the cast-iron bracket body 72 whereas the other of the bracket bodies is the sheet-metal bracket body 71. The upper end of the cast-iron bracket body 72 is fastened to the exhaust gas purifier 2 while the lower end of the cast-iron bracket body 72 is fastened to the cylinder head 5 of the engine 1. Through the auxiliary sheet-metal bracket 73, the vertically middle portion of the cast-iron bracket body 72 is coupled to the intake manifold 6 of the engine 1. Consequently, the intake manifold 6 and the cast-iron bracket body 72 are coupled through the auxiliary sheet-metal bracket 73 to secure sufficient coupling strength (rigidity) of the cast-iron bracket body 72 with respect to the engine 1. This prevents vibration of the engine 1 or such a factor from degrading and damaging the exhaust gas purifier 2, thus contributing to improvement in durability of the exhaust gas purifier 2.

Next, referring to FIGS. 12 to 15, a configuration of arrangement of control harnesses 101 with respect to the engine 1.

Conventionally, there has been a technique of disposing harnesses on an upper surface of an engine through brackets (see Japanese Unexamined Patent Application Publication No. 2006-271133). Also, there have been known a technique of coupling harnesses to an engine controller through connectors (see Japanese Unexamined Patent Application Publication No. 2006-342704), and a technique of disposing a common rail system on an engine (see Japanese Unexamined Patent Application Publication No. 2008-88982).

Desirably, control harnesses provided for an engine are collected in one place, thereby reducing the kinds (the attachment number) of the control harnesses. The engine is increased in temperature when driven. Consequently, when the control harnesses are attached to the engine, a consideration of arrangement of the control harnesses is required to prevent the control harnesses from direct contact with a high temperature portion of the engine, for example. In particular, an engine with a common rail system including a number of components is provided with a plurality of fuel pipes outside of the engine. In order to hinder electrification of these fuel pipes, arrangement of control harnesses is required to avoid contact between the group of fuel pipes and the control harnesses.

Figure 12:
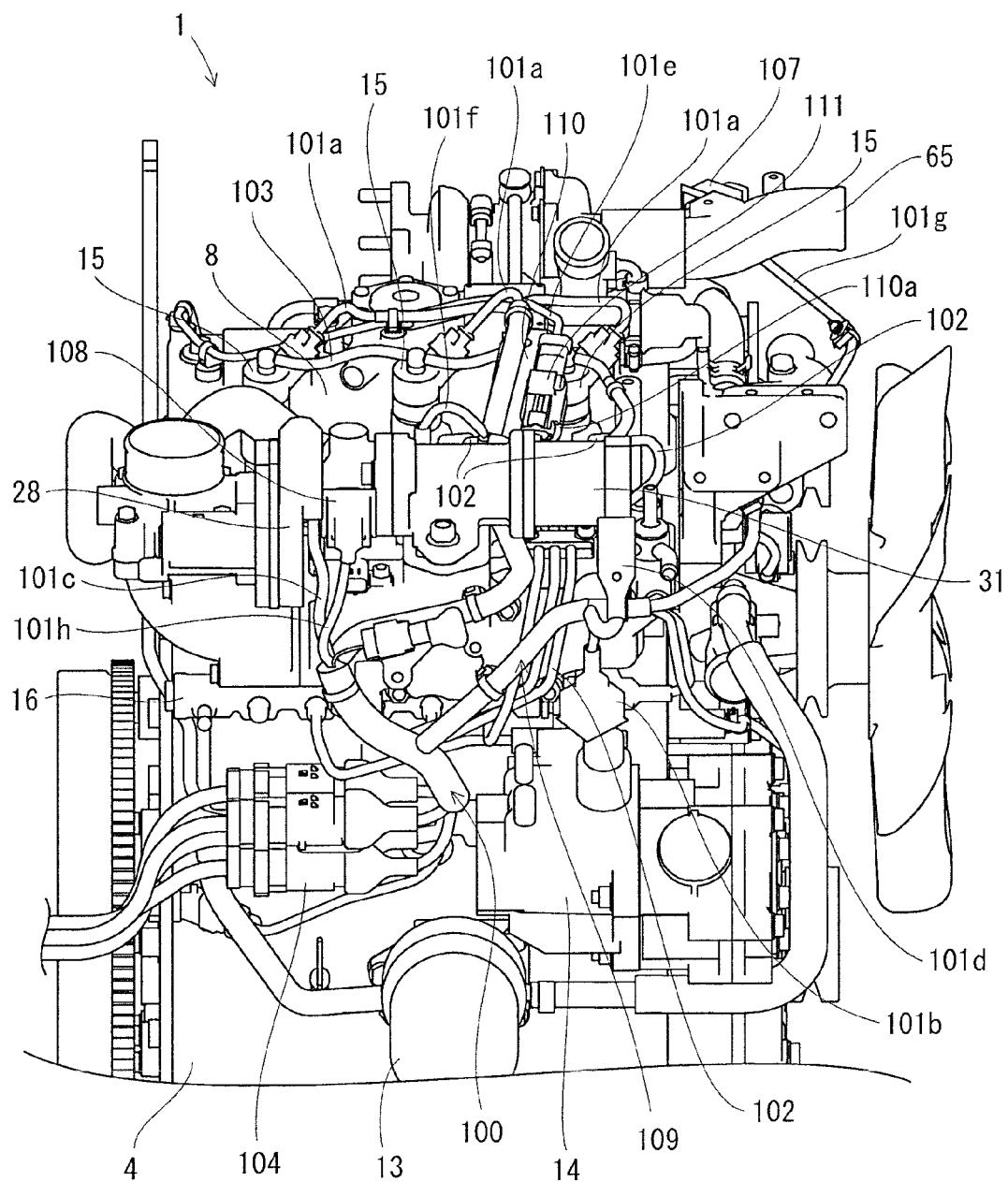
FIG. 12 is a perspective view of the engine, illustrating a state of attachment of control harnesses.
Figure 13:
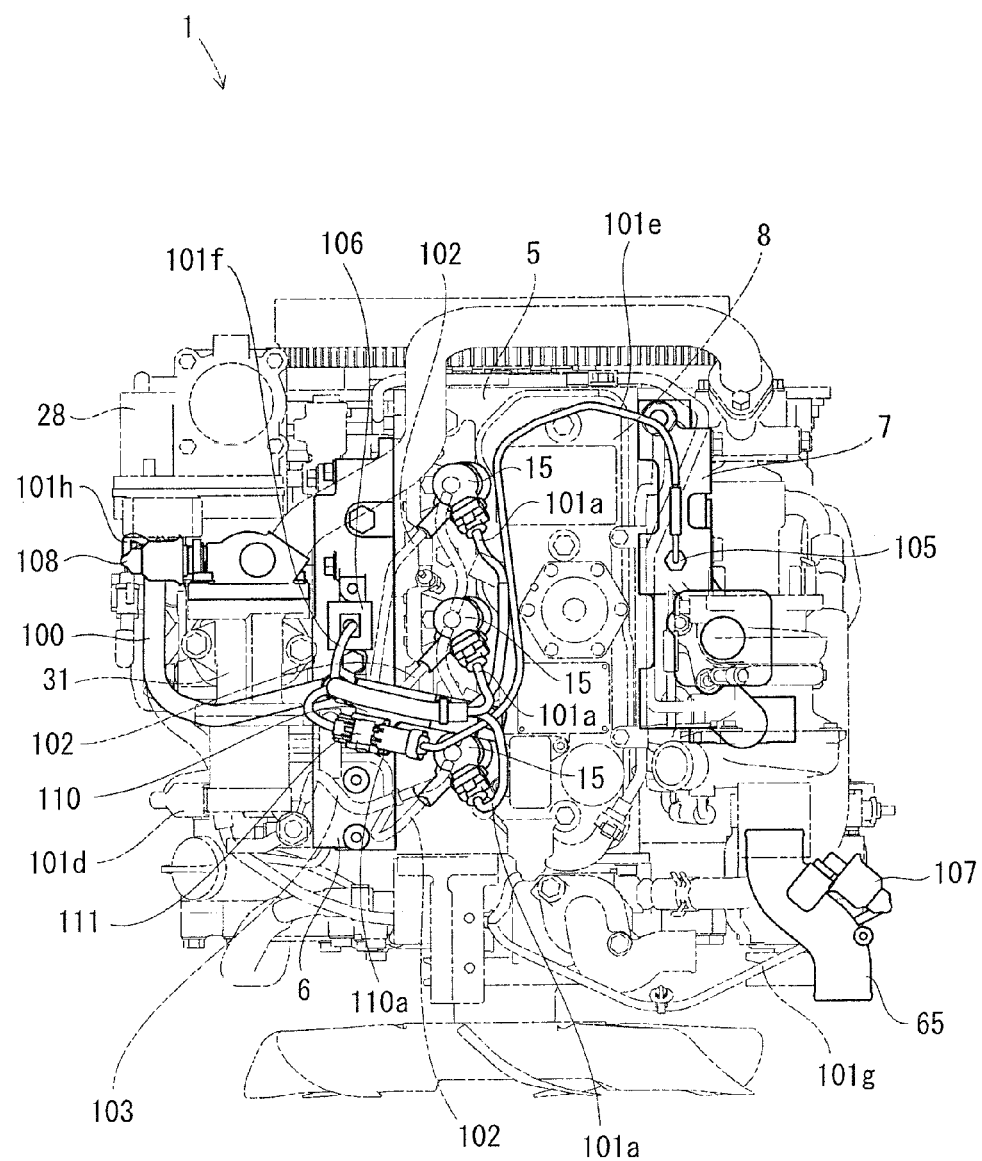
FIG. 13 is an enlarged plan view for describing a harness support.
Figure 14:
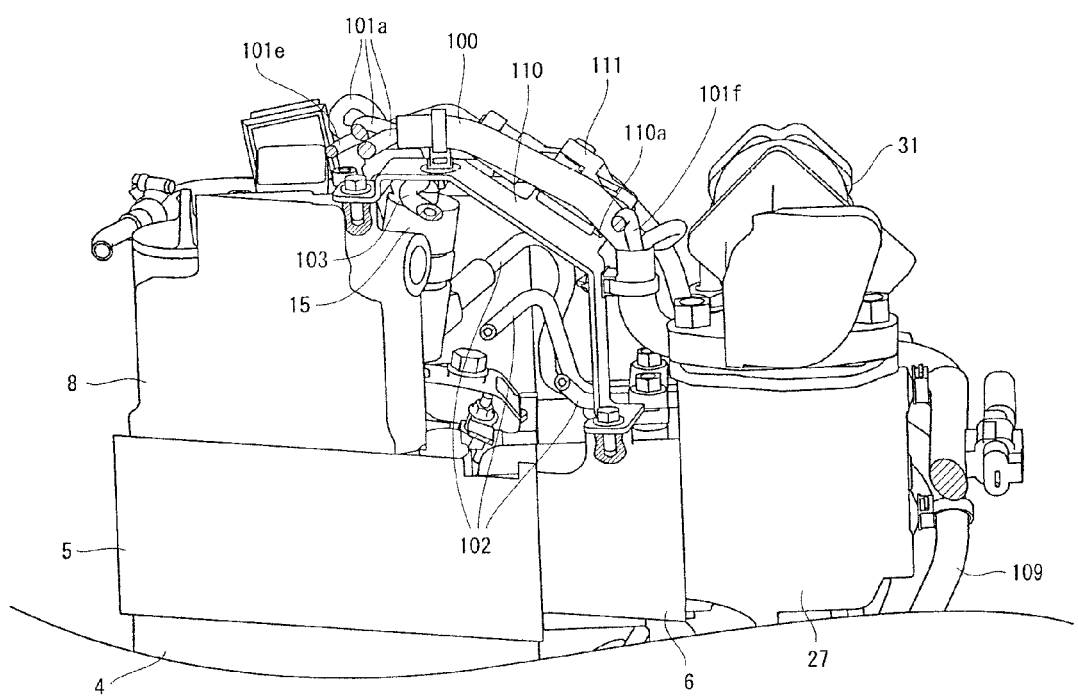
FIG. 14 is a front cross-sectional view for describing the harness support.
Figure 15:
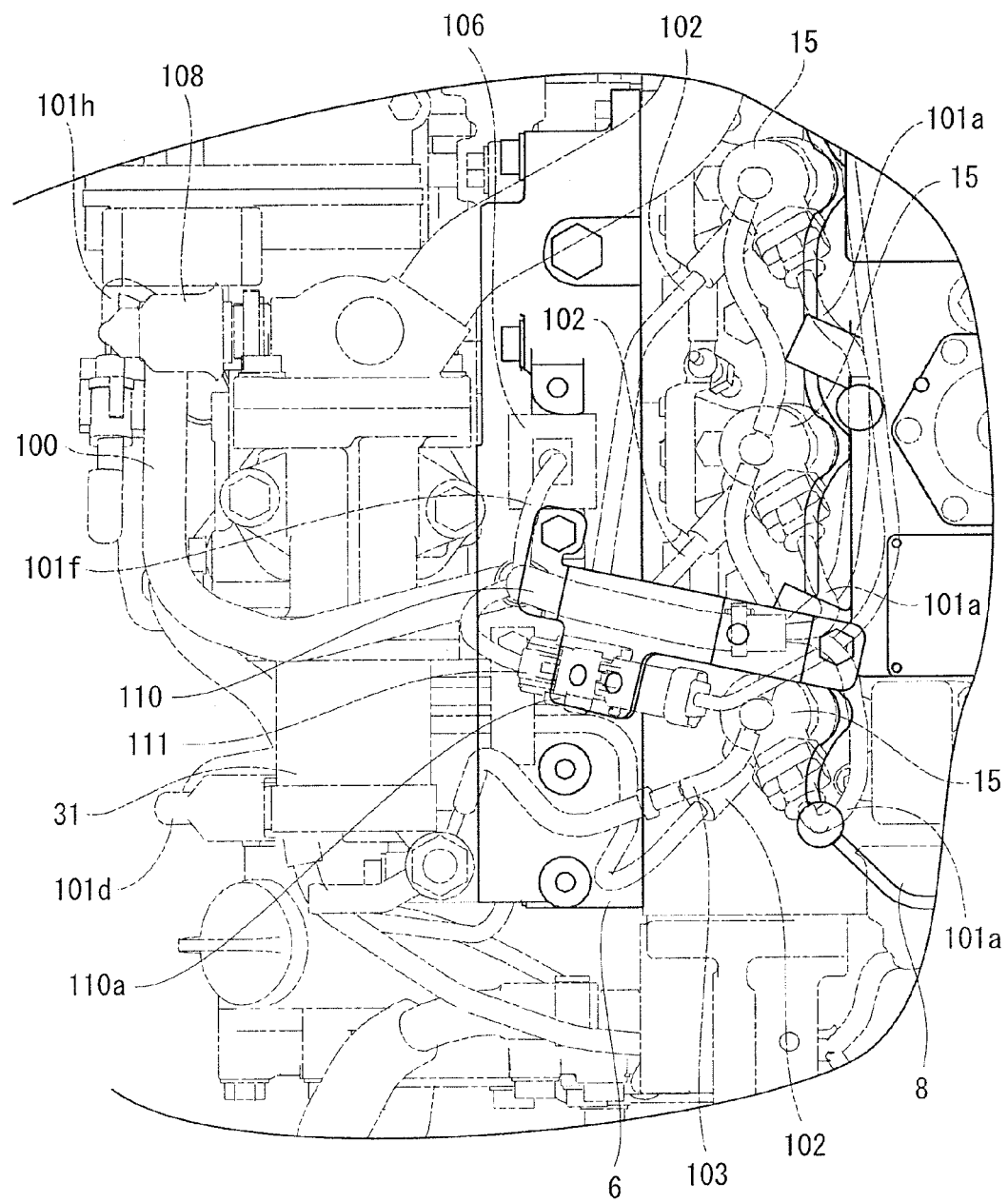
FIG. 15 is an enlarged plan view for describing a shape of the harness support.

An embodiment shown in FIGS. 12 to 15 has been improved in view of the above-described current circumstances. As shown in FIGS. 12 and 13, the injectors 15 for three cylinders are disposed outside of the head cover 8 on the cylinder head 5. The injectors 15 in this embodiment are positioned above the cylinder head 5 between the head cover 8 and the intake manifold 6. The injectors 15 are respectively coupled to the common rail 16 through fuel injection pipes 102. The injectors 15 are connected to each other through a fuel return pipe 103. Through the fuel return pipe 103, superfluous fuel is returned to the fuel tank (not shown) side. As is clear from the mounting positions of the injectors 15, the fuel injection pipes 102 and the fuel return pipe 103 are exposed to the outside of the head cover 8 above the cylinder head 5 (between the head cover 8 and the intake manifold 6). The fuel injection pipes 102 and the fuel return pipe 103 correspond to fuel piping.

The engine 1 in this embodiment is provided with a harness assembly 100 including a plurality of control harnesses 101a to 101h collected in one place. The control harnesses 101a to 101h couple objects to be controlled such as the injectors 15 with a controller (not shown). One end of the harness assembly 100 (one end of each of the control harnesses 101a to 101h) is coupled to the above-mentioned objects to be controlled such as the injectors 15. The other end of the harness assembly 100 (the other end of each of the control harnesses 101a to 101h) is coupled to a harness connector 104 located on the right side surface of the cylinder block 4 between the common rail 16 and the oil filter 13. Although not shown, an external harness coupled to the controller is coupled to the harness connector 104. Electric power and control signals from the controller, which have passed the external harness, are transmitted to the objects to be controlled such as the injectors 15 through the harness connector 104 and the harness assembly 100 (control harnesses 101a to 101h). Thus, the objects to be controlled such as the injectors 15 are electronically controlled, and their control states are detected.

The control harnesses 101a to 101h in this embodiment are injector harnesses 101a, a pump harness 101b, a throttle harness 101c, a valve harness 101d, an exhaust sensor harness 101e, an intake sensor harness 101f, a fresh air sensor harness 101g, and an EGR gas sensor harness 101h. The injector harnesses 101a are coupled to the respective injectors 15. The pump harness 101b is coupled to the fuel supply pump 14. The throttle harness 101c is coupled to the intake throttle member 28. The valve harness 101d is coupled to the EGR valve member 31. The exhaust sensor harness 101e is coupled to an exhaust sensor 105 to detect internal temperature of the exhaust manifold 7. The intake sensor harness 101f is coupled to an intake sensor 106 to detect internal temperature of the intake manifold 6. The fresh air sensor harness 101g is coupled to a fresh air temperature sensor 107 disposed on the air duct 65. The EGR gas sensor harness 101h is coupled to an EGR gas temperature sensor 108 disposed on the outlet side of the recirculation exhaust gas pipe 30.

It should be noted that the intake sensor 106, the fresh air temperature sensor 107, and the EGR gas temperature sensor 108 are used for calculating an EGR ratio of the mixture gas. The EGR ratio is acquired by dividing an EGR gas amount by the sum of the EGR gas amount and a fresh air amount (=EGR gas amount/(EGR gas amount+fresh air amount)).

The harness assembly 100 extends from the right side surface of the cylinder block 4 between the common rail 16 and the oil filter 13 to the upper side of the head cover 8 through a space between the EGR main body case 27 and the FGR valve member 31. A lower branch harness assembly 109 diverges from a lower side of the harness assembly 100. From a distal end side of the lower branch harness assembly 109, the pump harness 101b, the valve harness 101d, and the fresh air sensor harness 101g, for example, are exposed and extend to be respectively coupled to the corresponding objects to be controlled 14, 31, and 107. A distal end of the pump harness 101b is coupled to the fuel supply pump 14. A distal end of the valve harness 101d is coupled to the EGR valve member 31. A distal end of the fresh air sensor harness 101g is coupled to the fresh air temperature sensor 107.

From a longitudinally middle portion of the harness assembly 100, such components as the throttle harness 101c and the EGR gas sensor harness 101h are exposed and extend. A distal end of the throttle harness 101c is coupled to the intake throttle member 28. A distal end of the EGR gas sensor harness 101h is coupled to the EGR gas temperature sensor 108. From an upper side of the harness assembly 100, the exhaust sensor harness 101e and the intake sensor harness 101f are exposed and extend. A distal end of the exhaust sensor harness 101e is coupled to the exhaust sensor 105 of the exhaust manifold 7. A distal end of the intake sensor harness 101f is coupled to the intake sensor 106 of the intake manifold 6.

From an upper end of the harness assembly 100, the injector harnesses 101a are exposed and extend to be respectively coupled to the injectors 15 for the three cylinders. A distal end of each of the injector harnesses 101a is coupled to the corresponding injector 15. In this case, a harness support 110 to which the upper end of the harness assembly 100 is attached is disposed on the cylinder head 5.

The harness support 110 is disposed above the foremost injector 15 and over the fuel injection pipes 103 and the fuel return pipe 103. The harness support 110 in this embodiment is made of a metal plate. An upper end of the harness support 110 is fastened to the upper surface of the head cover 8 whereas a lower end of the harness support 110 is fastened to the upper surface of the intake manifold 6. The upper end of the harness assembly 100 (specifically, the upper side of a diverging portion of the exhaust sensor harness 101e and the intake sensor harness 101f) is mounted on the upper surface of the harness support 110 in a longitudinal direction of the harness support 110, and detachably secured by a cable tie, for example.

With this configuration, the upper end of the harness assembly 100 is mounted and secured on the harness support 110. Thus, the upper end of the harness assembly 100 is located apart from the cylinder head 5, which is a high temperature portion of the engine 1. Also, contact of the fuel injection pipes 102 and the fuel return pipe 103 with the upper end of the harness assembly 100 is avoided. This minimizes degradation of the harness assembly 100 due to high temperature (heat), and at the same time prevents electrification of the fuel injection pipes 102 and the fuel return pipe 103. Moreover, the existence of the harness support 110 facilitates recognition of the wiring pathway of the harness assembly 100 at the time of assembling work, thereby serving to improve assembling workability of the harness assembly 100.

Furthermore, one end of the harness support 110 is fastened to the upper surface of the head cover 8 whereas the other end of the harness support 110 is fastened to the intake manifold 6. Consequently, the harness support 110 serves as a bridge reliably crossing over the injectors 15, the fuel injection pipes 102, and the fuel return pipe 103. This ensures avoidance of contact of the harness assembly 100 with the cylinder head 5, the fuel injection pipes 102, and the fuel return pipe 103.

It should be noted that in this embodiment, due to the positional relationship between the head cover 8 and the injectors 15, the lower end of the harness support 110 is fastened to the intake manifold 6. However, this should not be construed in a limiting sense. The lower end of the harness support 110 may be fastened to the cylinder head 5 itself or to the exhaust manifold 7.

As shown in FIGS. 12 to 15, in this embodiment, the exhaust sensor harness 101e is a branch harness diverging from the harness assembly 100. The exhaust sensor harness 101e extends to the exhaust sensor 105 of the exhaust manifold 7 through a relay connector 111. The harness support 110 is integral with a connector attachment portion 10a. The relay connector 111 of the exhaust sensor harness 101e is mounted on and screwed to the connector attachment portion 110a of the harness support 110. Therefore, the upper end of the harness assembly 100 and the relay connector 111 are attached side by side to the harness support 110. Thus, not only the harness assembly 100 but also the relay connector 111 of the exhaust sensor harness 101e is secured on the harness support 110. This reduces the number of components and saves space. Also, the wiring group including the harness assembly 100 and the relay connector 111 is suitably attached to the engine 1.

As is apparent from the above description and FIGS. 12 to 15, in the engine apparatus, the engine 1 includes the injectors 15 on the cylinder head 5. The fuel piping 102 and 103 to supply fuel to the injectors 15 and the control harnesses 100 (101a to 101h) are disposed outside of the engine 1 and adjacent to each other. The harness support 110 to which the control harnesses 100 are attached is disposed on the cylinder head 5 and crosses over the fuel piping 102 and 103. Consequently, when the control harnesses 100 are mounted and secured on the harness support 110, the control harnesses 100 are located apart from the cylinder head 5, which is a high temperature portion of the engine 1. Also, contact of the fuel piping 102 and 103 with the control harnesses 100 is avoided. This minimizes degradation of the control harnesses 100 due to high temperature (heat), and at the same time prevents electrification of the fuel piping 102 and 103. Moreover, the existence of the harness support 110 facilitates recognition of the wiring pathway of the control harnesses 100 at the time of assembling work, thereby serving to improve assembling workability of the control harnesses 100.

As is apparent from the above description and FIGS. 12 to 15, the head cover 8 is disposed on the cylinder head 5. The intake manifold 6 and the exhaust manifold 7 are separately disposed on both side surfaces of the cylinder head 5 that intersect the output shaft 3. The injectors 15 are located on the cylinder head 5 outside of the head cover 8. One end of the harness support 110 is fastened to the head cover 8. The other end of the harness support 110 is fastened to the manifold 6, which is one of the intake manifold 6 and the exhaust manifold 7 that is on the side of the injectors 15 that is opposite to the head cover 8 side. Consequently, the harness support 110 serves as a bridge reliably crossing over the injectors 15 and the fuel piping 102 and 103. Therefore, the effect of claim 1 is positively obtained. That is, contact of the control harnesses 100 with the cylinder head 5 and the fuel piping 102 and 103 is avoided definitely.

As is apparent from the above description and FIGS. 12 to 15, the harness support 110 is integral with the connector attachment portion 110a supporting the relay connector 111 of the branch harness 101e that diverges from the control harnesses 100. Thus, not only the control harnesses 100 but also the relay connector 111 of the branch harness 101e is secured on the harness support 110. This reduces the number of components and saves space. Also, the wiring group including the control harnesses 100 and the relay connector 111 is suitably attached to the engine 1.

It should be noted that the configurations of the components in the present invention should not be limited to the embodiment illustrated in the drawings. Various modifications are possible within the scope of the present invention.

DESCRIPTION OF REFERENCE NUMERAL

1 Engine
2 Exhaust gas purifier
3 Output shaft
4 Cylinder block
5 Cylinder head
6 Intake manifold
7 Exhaust manifold
8 Head cover
9 Cooling fan
70 Mounting base
71 Inlet-side bracket body (sheet-metal bracket body)
72 Outlet-side bracket body (die-cast bracket body)
73 Coupling bracket (auxiliary sheet-metal bracket)
100 Harness assembly
101a to 101h Control harness
102 Fuel injection pipe (fuel piping)
103 Fuel return pipe (fuel piping)
104 Harness connector
105 Exhaust sensor
106 Intake sensor
107 Fresh air temperature sensor
108 EGR gas temperature sensor
109 Lower branch harness assembly
110 Harness support
110a Connector attachment portion
111 Relay connector

The invention claimed is:

1. An engine apparatus comprising:
an engine having an intake manifold, an exhaust manifold, a cylinder head having a head cover, and an output shaft;
a cooling fan disposed on a front surface of the engine that intersects the output shaft;
a power generator;
an EGR device;
a coolant pump;
an inlet-side bracket body and an outlet-side bracket body;
an exhaust gas purifier configured to purify exhaust gas from the engine,
the exhaust gas purifier being mounted on the engine with a longitudinal direction of the exhaust gas purifier being orthogonal to the output shaft,
the exhaust gas purifier being supported by the cylinder head through the inlet-side bracket body and the outlet-side bracket body at a portion on an upper surface of the engine located between the head cover and the cooling fan;
a lower end of the outlet-side bracket body being connected to a front surface of the cylinder head, and a lower end of the inlet-side bracket being connected to a front portion of a side surface of the cylinder head, an upper edge of each of the outlet-side bracket body and the inlet-side bracket body being connected by a reinforcement plate;
a receiving bracket affixed by welding to the exhaust downstream side of the exhaust gas purifier and being affixed to the reinforcement plate;
a flange of the exhaust gas purifier being affixed to an upper edge of the outlet-side bracket body;
the intake manifold and the exhaust manifold being separately disposed on respective side surfaces of the engine along the output shaft,
the power generator being disposed on a side of the exhaust manifold,
the EGR device being disposed on a side of the intake manifold,
the coolant pump being disposed on a side of the cooling fan, and
each one of the inlet-side bracket body and the outlet-side bracket body being set up above a cooling fan side of the cylinder head, and
the exhaust gas purifier being located in a range of an installation width of the power generator and the EGR device and above the coolant pump.

2. The engine apparatus according to claim 1, further comprising:
a detection member that operates to detect with respect to the exhaust gas purifier and that has an electric wiring connector disposed on an outer peripheral portion of the exhaust gas purifier at a side opposite a side of the cooling fan.

3. The engine apparatus according to claim 1, wherein the outlet-side bracket body is cast-iron and the inlet-side bracket body is sheet-metal.

4. The engine apparatus according to claim 1, wherein the outlet-side bracket body is cast-iron and the inlet-side bracket is sheet-metal, an upper end of the outlet-side bracket body being fastened to the exhaust gas purifier, a vertically middle portion of the cast-iron bracket body being coupled to an intake manifold of the engine through an auxiliary sheet-metal bracket.

5. The engine apparatus according to claim 1, further comprising:
   injectors on the cylinder head;
   fuel piping configured to supply fuel to the injectors;
   control harnesses located adjacent to each other and disposed outside of the engine; and
   a harness support to which the control harnesses are attached, the harness support being disposed on the cylinder head and crossing over the fuel piping.

6. The engine apparatus according to claim 5, further comprising a head cover disposed on the cylinder head, and in which said intake manifold and an exhaust manifold are separately disposed on respective side surfaces of the cylinder head, the injectors are located on the cylinder head outside of the head cover,
   one end of the harness support is fastened to the head cover, and another end of the harness support is fastened to one manifold of the intake manifold and the exhaust manifold, said one manifold being located on a side of the injectors that is opposite a side of the head cover.

7. The engine apparatus according to claim 5, wherein the harness support is integral with a connector attachment portion supporting a relay connector of a branch harness that diverges from the control harnesses.

* * * * *